US011502786B2

(12) United States Patent
Jang et al.

(10) Patent No.: US 11,502,786 B2
(45) Date of Patent: Nov. 15, 2022

(54) ELECTRONIC DEVICE FOR RETRANSMITTING DATA IN BLUETOOTH NETWORK ENVIRONMENT AND METHOD THEREOF

(71) Applicant: Samsung Electronics Co., Ltd., Gyeonggi-do (KR)

(72) Inventors: Wonkyoung Jang, Gyeonggi-do (KR); Doosuk Kang, Gyeonggi-do (KR); Bokun Choi, Gyeonggi-do (KR); Gupil Cheong, Gyeonggi-do (KR); Inhyuk Choi, Gyeonggi-do (KR); Jongmu Choi, Gyeonggi-do (KR); Ilsung Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 16/983,320

(22) Filed: Aug. 3, 2020

(65) Prior Publication Data

US 2021/0050960 A1 Feb. 18, 2021

(30) Foreign Application Priority Data

Aug. 16, 2019 (KR) .................. 10-2019-0100099

(51) Int. Cl.
*H04L 1/18* (2006.01)
*H04W 28/04* (2009.01)
(Continued)

(52) U.S. Cl.
CPC .......... *H04L 1/1887* (2013.01); *H04L 5/0055* (2013.01); *H04W 4/80* (2018.02); *H04W 28/04* (2013.01); *H04W 52/0261* (2013.01)

(58) Field of Classification Search
CPC ...... H04L 1/1887; H04L 5/0055; H04W 4/80; H04W 28/04; H04W 52/0261
See application file for complete search history.

(56) References Cited

U.S. PATENT DOCUMENTS 8,768,252 B2 7/2014 Watson et al.
8,811,500 B2 8/2014 Smith et al.
(Continued)

FOREIGN PATENT DOCUMENTS

KR 10-2018-0128302 A 12/2018

OTHER PUBLICATIONS

International Search Report dated Nov. 20, 2020.

*Primary Examiner* — Pankaj Kumar
*Assistant Examiner* — Eric V. Phu
(74) *Attorney, Agent, or Firm* — Cha & Reiter, LLC

(57) ABSTRACT

Disclosed is an electronic device includes a wireless communication circuit configured to support Bluetooth communication; at least one processor operatively connected to the wireless communication circuit; and a memory operatively connected to the at least one processor, wherein the memory stores one or more instructions that, when executed, cause the at least one processor to perform a plurality a plurality of operations comprising: receiving first data transmitted from a first external electronic device via a first link between the electronic device and the first external electronic device; when an acknowledgement (ACK) is not received from a second external electronic device, determining that the first external electronic device or the electronic device should retransmit the first data to the second external electronic device based on at least one of status information about the electronic device, status information about the first external electronic device, communication quality of the first link, or communication quality of the second link.

11 Claims, 16 Drawing Sheets

(51) Int. Cl.
*H04W 4/80* (2018.01)
*H04L 5/00* (2006.01)
*H04W 52/02* (2009.01)

(56) References Cited

U.S. PATENT DOCUMENTS

| | | |
|---|---|---|
| 9,020,437 B2 | 4/2015 | Watson et al. |
| 9,565,255 B2 | 2/2017 | Kapoor et al. |
| 9,641,622 B2 | 5/2017 | Kapoor et al. |
| 9,860,932 B2 | 1/2018 | Kapoor et al. |
| 9,924,010 B2 | 3/2018 | Watson et al. |
| 10,015,836 B2 | 7/2018 | Kapoor et al. |
| 10,042,595 B2 | 8/2018 | Behzadi et al. |
| 10,070,212 B2 | 9/2018 | Watson et al. |
| 10,104,474 B2 | 10/2018 | Watson et al. |
| 10,136,429 B2 | 11/2018 | Lee et al. |
| 10,142,750 B2 | 11/2018 | Hariharan et al. |
| 10,212,569 B1 | 2/2019 | Huang et al. |
| 10,219,062 B2 | 2/2019 | Watson et al. |
| 10,448,232 B2 | 10/2019 | Sung et al. |
| 10,499,154 B2 | 12/2019 | Watson et al. |
| 10,524,037 B2 | 12/2019 | Watson et al. |
| 10,554,800 B2 | 2/2020 | Watson et al. |
| 2011/0002402 A1 | 1/2011 | Smith et al. |
| 2016/0360018 A1 | 12/2016 | Watson et al. |
| 2017/0013342 A1 | 1/2017 | Watson et al. |
| 2017/0188405 A1 | 6/2017 | Kapoor et al. |
| 2017/0251469 A1 | 8/2017 | Lee et al. |
| 2017/0311105 A1 | 10/2017 | Hariharan et al. |
| 2018/0067712 A1 | 3/2018 | Behzadi et al. |
| 2018/0077493 A1 | 3/2018 | Watson et al. |
| 2018/0084456 A1* | 3/2018 | Gostev .................. H04W 84/18 |
| 2018/0092145 A1 | 3/2018 | Kapoor et al. |
| 2018/0341448 A1 | 11/2018 | Behzadi et al. |
| 2019/0052984 A1 | 2/2019 | Hariharan et al. |
| 2019/0141502 A1 | 5/2019 | Sung et al. |
| 2019/0159002 A1 | 5/2019 | Huang et al. |
| 2019/0230459 A1 | 7/2019 | Sridharan et al. |
| 2019/0239054 A1 | 8/2019 | Sung et al. |
| 2019/0335264 A1 | 10/2019 | Watson et al. |
| 2020/0162205 A1 | 5/2020 | Han et al. |
| 2021/0337610 A1* | 10/2021 | Yu ........................... G06F 3/165 |

\* cited by examiner

ELECTRONIC DEVICE FOR RETRANSMITTING DATA IN BLUETOOTH NETWORK ENVIRONMENT AND METHOD THEREOF

CROSS-REFERENCE TO RELATED APPLICATION(S)

This application claims the benefit under 35 U.S.C. § 119(a) of a Korean patent application filed on Aug. 16, 2019 in the Korean Intellectual Property Office and assigned Serial number 10-2019-0100099, the entire disclosure of which is hereby incorporated by reference.

TECHNICAL FIELD

Certain embodiments of the present disclosure relate to an electronic device for retransmitting data in a Bluetooth network environment and a method thereof.

BACKGROUND

A Bluetooth technology standard stipulated by the Bluetooth Special Interest Group (SIG) defines a protocol for short range wireless communication between electronic devices. In a Bluetooth network environment, electronic devices may transmit or receive data packets including content such as a text, voice, image, or video at a specified frequency band (e.g., about 2.4 gigahertz (GHz)).

For example, user equipment (UE) such as smartphone, tablet, desktop computer, or laptop computer may transmit data packets to another user equipment or accessory device. The accessory device may include, by way of example, and not limitation, at least one of an earphone, a headset, a speaker, a mouse, a keyboard, or a display device.

SUMMARY

Certain embodiments include an electronic device. The electronic device includes a wireless communication circuit configured to support Bluetooth communication; at least one processor operatively connected to the wireless communication circuit; and a memory operatively connected to the at least one processor, wherein the memory stores one or more instructions that, when executed, cause the at least one processor to perform a plurality a plurality of operations comprising: receiving first data transmitted from a first external electronic device via a first link between the electronic device and the first external electronic device; when an acknowledgement (ACK) is not received from a second external electronic device, determining that the first external electronic device or the electronic device should retransmit the first data to the second external electronic device based on at least one of status information about the electronic device, status information about the first external electronic device, communication quality of the first link, or communication quality of the second link.

In certain embodiments, a method for retransmitting data of an electronic device comprises creating a first link with a first external electronic device using a wireless communication circuit of the electronic device; creating a second link with a second external electronic device using the wireless communication circuit; receiving first data transmitted via the first link from the first external electronic device; monitoring the second link for a response to the first data from the second external electronic device; and when the response is not received or indicates a negative acknowledgement (NACK), determining that the first external electronic device or the electronic device should retransmit the first data to the second external electronic device based on at least one of status information about the electronic device, status information about the first external electronic device, communication quality of the first link, or communication quality of the second link.

In certain embodiments, an electronic device comprises a wireless communication circuit configured to support Bluetooth communication; at least one processor operatively connected to the wireless communication circuit; and a memory operatively connected to the at least one processor, wherein the memory stores one or more instructions that, when executed, cause the at least one processor to perform a plurality of operations, wherein the plurality of operations comprise: creating a first link with a first external electronic device using the communication circuit; creating a second link with a second external electronic device using the communication circuit; transmitting first data to the first external electronic device via the first link; receiving, from the first external electronic device via the first link, a first response indicating an acknowledgement (ACK) of the first data; receiving, from the second external electronic device via the second link, a second response indicating negative ACK (NACK) for the first data; and determining that the first external electronic device or the electronic device should retransmit the first data to the second external electronic device based on at least one of status information about the electronic device or communication quality of the first link.

BRIEF DESCRIPTION OF THE DRAWINGS

With respect to the description of the drawings, the same or similar reference signs may be used for the same or similar elements.

DETAILED DESCRIPTION

A topology representing the Bluetooth network environment may include one user device (e.g., a device under test (DUT)) that transmits data packets and a plurality of devices that receive data packets from the user device. For example, when an earphone (or headset) is connected to a smartphone, the earphone worn on the left ear of a user and the earphone worn on the right ear of the user may receive data packets from the smartphone.

Each of a plurality of devices receiving data packets may form an individual link with the user device unless the plurality of devices are connected to each other by wire. In this case, since the user device has to generate a plurality of links in order to transmit data packets, resource consumption and power consumption of the user device may occur and complexity may increase. Furthermore, as the number of devices to which the user device has to transmit data packets increases, the power consumption of the user device and the time lag for the data packets to arrive at the devices may increase. Furthermore, although one earphone may receive data, the other earphone may fail to receive data. In this case, the power consumption of the user device may increase due to retransmission of data. Moreover, network throughput may decrease due to repetition of duplicative retransmission of data.

Certain embodiments disclosed in the present disclosure may provide an electronic device and a method for overcoming the above-described limitation in a Bluetooth network environment.

Hereinafter, certain embodiments of the present disclosure will be described in detail with reference to the accompanying drawings. However, it should be understood that the present disclosure is not limited to specific embodiments, but rather includes various modifications, equivalents and/or alternatives of certain embodiments of the present disclosure.

Figure 1:
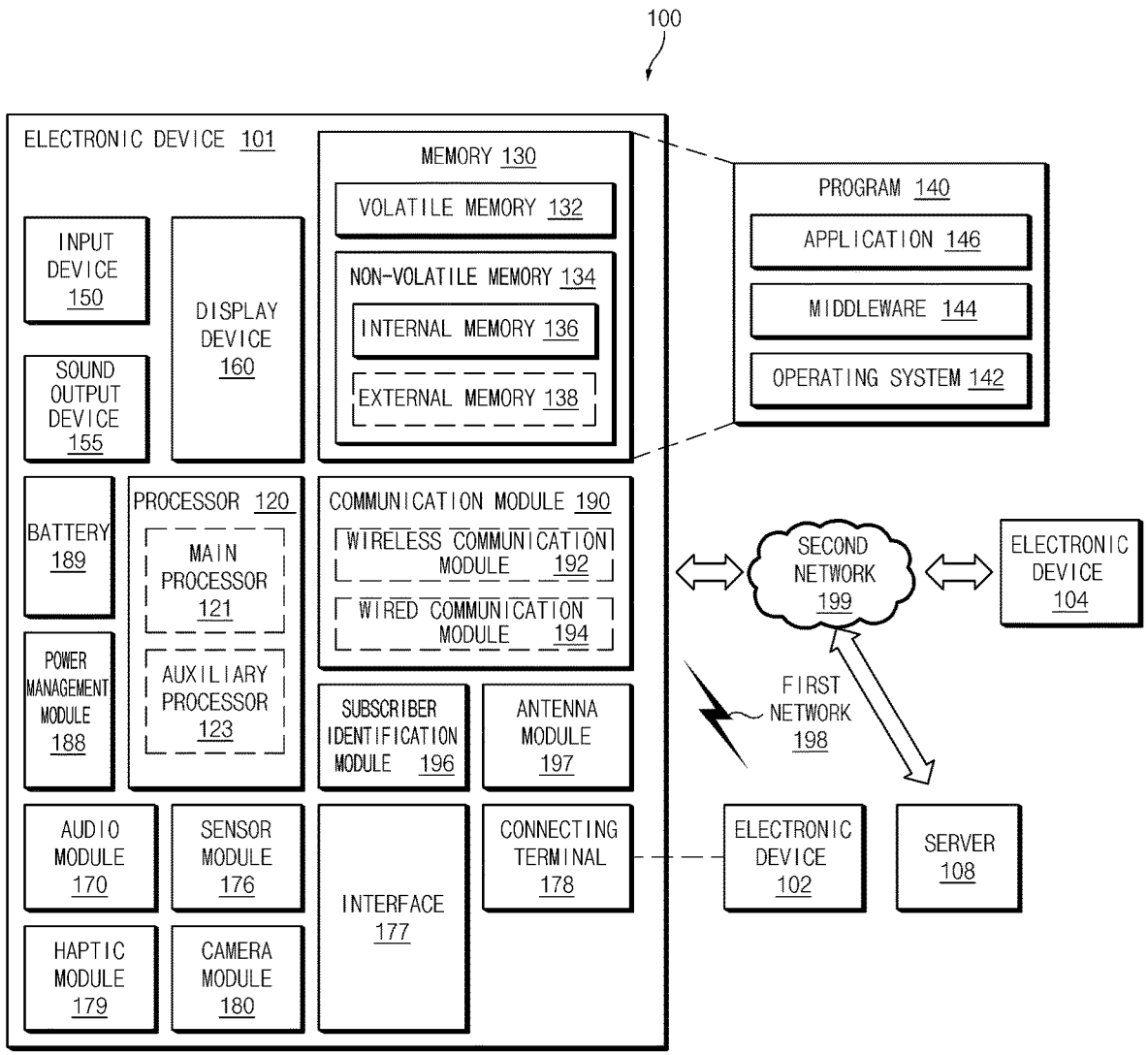
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
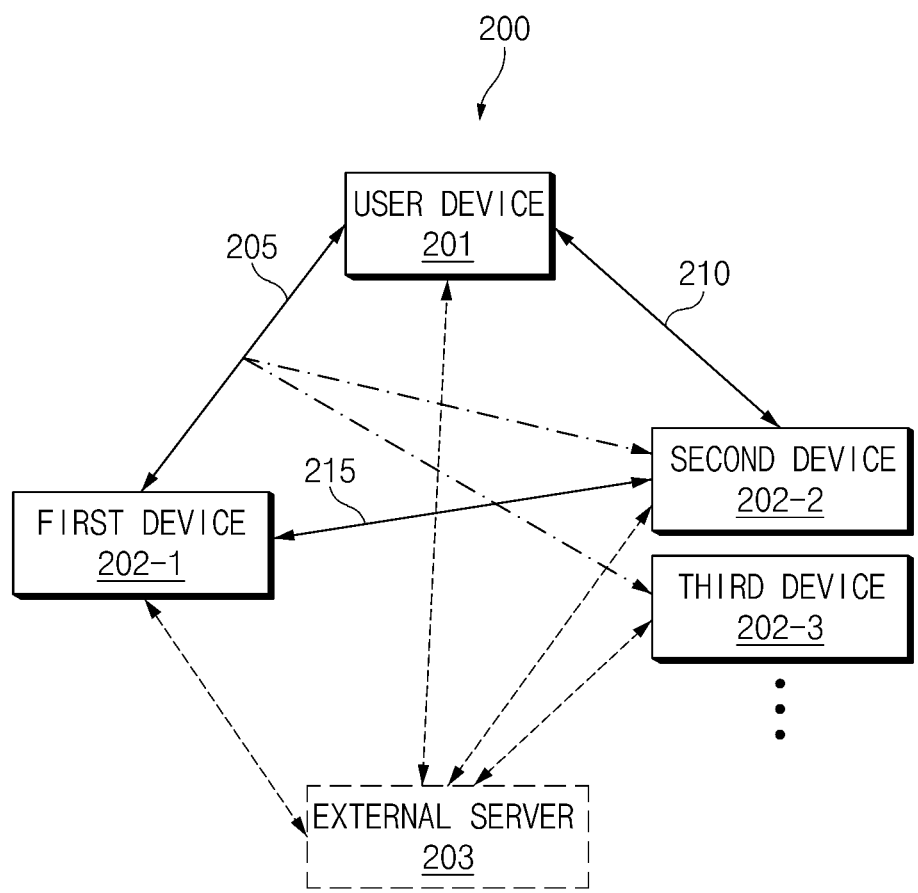
FIG. 2 is a diagram illustrating a topology in a Bluetooth network environment according to certain embodiments.

FIG. 2 illustrates a topology 200 of a Bluetooth network environment according to certain embodiments.

The user device 201 may establish a plurality of links, including a link 205 with device 202-1 and a link 210 with device 202-2. Since the user device 201 has to generate a plurality of links in order to transmit data packets to each device 202-1, 202-2, resource contention and power consumption at the user device become issues. Furthermore, the time required for data packets to arrive at the devices 202-1, 202-2, may increase, thereby causing a time lag.

Referring to FIG. 2, the electronic device 201 and devices 202-1, 202-2, and 202-3 included in the topology 200 may include components, at least some of which are the same as or similar to those of the electronic device 101 illustrated in FIG. 1, and may execute functions, at least some of which are the same as or similar to those of the electronic device 101. For example, the user device 201 and the devices 202-1, 202-2, and 202-3 may perform wireless communication at a short range according to a Bluetooth network defined by the Bluetooth SIG. The Bluetooth network may include, for example, a Bluetooth legacy network and a Bluetooth low energy (BLE) network. According to an embodiment, the user device 201 and the devices 202-1, 202-2, and 202-3 may perform wireless communication via one or both of the Bluetooth legacy network and the BLE network.

The user device 201 may include, for example, a user equipment such as a smartphone, a tablet, a desktop computer, or a laptop computer, and the devices 202-1, 202-2, and 202-3 may include an accessory device such as an earphone, a headset, a speaker, a mouse, a keyboard, or a display device. For example, devices 202-1 and 202-2 can include a left earbud and a right earbud. According to an embodiment, each of the devices 202-1, 202-2, and 202-3 may recognize, in advance, a counterpart device (e.g., a first device 202-1, a second device 202-2, or a third device 202-3) or may store, in advance, information (e.g., address information) about the counterpart device. For example, when the first device 202-1 and the second device 202-2 are accessory devices (e.g., an earphone) constituting a single set, the first device 202-1 and the second device 202-2 may recognize each other or may store address information about each other in advance.

According to an embodiment, the user device 201 may serve as a master device, and the devices 202-1, 202-2, and 202-3 may serve as slave devices. The number of devices serving as a slave device is not limited to the example illustrated in FIG. 2. According to an embodiment, during a procedure in which a link (e.g., 205, 210, or 215) between devices are created, it may be determined which device should serve as a master device or a slave device. According to another embodiment, one of the first device 202-1 and the second device 202-2 (e.g., the first device 202-1) may serve as a master device, and the other device (e.g., the second device 202-2) may serve as a slave device.

The master device may control a physical channel (PHY). For example, the master device may transmit a data packet, whereas the slave device may transmit a data packet to the master device only after receiving a data packet. For another example, a channel resource (e.g., frequency hopping channel) for transmitting a data packet may be generated based on a clock of the master device. In the Bluetooth legacy network, a time resource (e.g., time slot) may be determined based on a clock of the master device. The time slot may be, for example, 625 μs (microseconds). In the BLE network, the master device and the slave device may transmit data packets at every specified interval, and, if data packets are received, may respond after a specified time (e.g., the inter frame space (T_IFS), about 150 μs).

According to an embodiment, the user device 201 may transmit a data packet including content such as text, voice, image, or video to the devices 202-1, 202-2, and 202-3. Not only the user device 201 but also at least one of the device 202-1, 202-2, or 202-3 may transmit a data packet according to the type of content included in a data packet. For example, only the user device 201 may transmit a data packet when music is played back on the user device 201, whereas, not only the user device 201 but also at least one of the device 202-1, 202-2, or 202-3 may transmit a data packet including content (e.g., voice data) to the user device 201 when a call is performed on the user device 201. In certain embodiments, audio and video can include compressed data that is further packetized, such as Packetized Elementary Streams (PES). When only the user device 201 transmits a data packet, the user device 201 may be referred to as a source device, and the devices 202-1, 202-2, and 202-3 may be referred to as a sink device.

When the user device 201 creates or establishes a plurality of links with the plurality of devices 202-1, 202-2, and 202-3 in order to transmit a data packet, the resource consumption and power consumption of the user device 201 may increase, and thus the user device 201 may form only the first link 205 with the first device 202-1, and may transmit a data packet via the first link 205. In this case, at least one of other devices (e.g., 202-2, 202-3) may monitor the first link 205 in order to receive a data packet including content, for example by establishment of link 215 between the first device 202-1. In this case, the user device 201 may be referred to as a device under test (DUT), the first device 202-1 may be referred to as a primary earbud or primary equipment (PE), and the at least one of other devices (e.g., 202-2, 202-3) may be referred to a secondary earbud or secondary equipment (SE).

According to an embodiment, the first device 202-1 may create a third link 215 with the second device 202-2. The first device 202-1 may transmit information associated with the first link 205 to the second device 202-2 via the third link 215 such that the second device 202-2 may monitor the first link 205 and may transmit a response message to the user device 201. Hereinafter, the term "monitoring" may represent a state of attempting to receive at least a portion of packets transmitted via a corresponding link or a state capable of receiving at least a portion of packets. For example, when the second device 202-2 monitors the first link 205, the second device 202-2 may receive or attempt to receive at least a portion of packets transmitted by the user device 201 or the first device 202-1 (e.g., electronic devices forming the first link 205) via the first link 205. In this case, the user device 201 may recognize the second device 202-2 using the second link 210, but may not recognize the presence of the second device 202-2 via the first link 205.

The information associated with the first link 205 may include address information (e.g., the Bluetooth address of the master device of the first link 205, the Bluetooth address of the user device 201, and/or the Bluetooth address of the first device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information. The information associated with the first link 205 may further include, for example, an extended inquiry response (EIR) packet. The EIR packet may include resource control information about the first link 205 and/or information about a manufacturer.

The second device 202-2 may determine a hopping channel (or frequency hopping channel) of the first link 205 through address information and clock information, and may decrypt encrypted data packet through the link key information. The second device 202-2 may generate an access code (or channel access code) and address information (e.g., LT address information) corresponding to the first link 205 based on the information associated with the first link 205, and may transmit a response message including the generated access code and address information to the user device 201. In this case, the user device 201 may determine whether to retransmit a data packet based on the response message transmitted from the second device 202-2 even if a link with the second device 202-2 is not created.

If the first device 202-1 and the second device 202-2 are devices that support the same user account or a similar user account (e.g., a family account), the first device 202-1 and the second device 202-2 may share the information associated with the first link 205 through an external device (e.g., an external server 203) interworking with the first device 202-1 or the second device 202-2 through the same or similar user account. In this case, the topology 200 may further include the external server 203. Likewise, the third device 202-3 may also be a device that supports the same user account or similar account (e.g., family account) as the first device 202-1. For example, the first device 202-1 may transmit the information associated with the first link 205 to the external server 203, and the external server 203 may transmit the information associated with the first link 205 to the second device 202-2 and/or the third device 202-3. When a request is received, for example, from the second device 202-2 and/or the third device 202-3, the external server 203 may transmit information (e.g., the information associated with the first link 205) received from the first device 202-1 and/or the user device 201 to the second device 202-2 and/or the third device 202-3. When the request is received from the second device 202-2 and/or the third device 202-3, the external server 203 may request the first device 202-1 and/or the user device 201 to transmit the information associated with the first link 205, and may receive the information associated with the first link 205 from the first device 202-1 and/or the user device 201. When the request is received from the second device 202-2 and/or the third device 202-3, the external server 203 may transmit the information associated with the first link 205, which is stored in the external server 203, to the second device 202-2 and/or the third device 202-3.

According to another embodiment, the second device 202-2 may share the information associated with the first link 205 from the user device 201. For example, the user device 201 may transmit the information associated with the first link 205 to the second device 202-2 via the second link 210. For example, after transmitting the information associated with the first link 205, the user device 201 may release the second link 210.

According to an embodiment, the first device 202-1 and/or the second device 202-2 may transmit a response message to the user device 201 in order to notify that the same data packet has been received normally. The response message may include a positive acknowledgement (ACK) message indicating that the data packet has been received normally or a negative acknowledgement (NACK) message indicating that the data packet has not been received normally. The response message may include, for example, 1-bit information. For example, if an ACK message is received after transmitting a data packet, the user device 201 may transmit a next data packet, and if a NACK message is received or a response message is not received within a specified time, the user device 201 may retransmit the same data packet. For another example, if a NACK message for a data packet is received or a response message is not received within the specified time, the user device 201 may cause another device (e.g., the first device 202-1) that has transmitted the ACK message to transmit the NACK message, or may cause another device (e.g., the second device 202-2) that has not transmitted the response message within the specified time to retransmit the data packet.

According to an embodiment, the second device 202-2 may transmit, to the user device 201 via the first link 205, a response message for the data packet received from the user device 201 via the first link 205. The user device 201 and/or the first device 202-1 may receive the response message from the second device 202-2 via the first link 205. In this case, the first device 202-1 and the second device 202-2 may transmit the response message using the same first link 205. For example, the first device 202-1 and the second device 202-2 may be configured to transmit the NACK at a timing earlier than the ACK. For another example, the second device 202-2 and the first device 202-1 may transmit a response message by dividing time slots of the first link 205 so that response messages do not overlap in time. For another example, the second device 202-2 may be configured to transmit a response message only when the reception of a data packet fails. In this case, the second device 202-2 may be configured to transmit a response message before the first device 202-1 when transmitting the NACK. If the NACK from the second device 202-2 is identified, the first device 202-1 may not transmit a response message. If a response message is not identified from the second device 202-2 within a specified time within the time slot, the first device 202-1 may transmit a response message to the user device 201 based on whether or not the first device 202-1 has received a data packet.

According to an embodiment, the second device 202-2 may transmit, to the user device 201 via the second link 210, a response message for the data packet received from the user device 201 via the first link 205. For example, the user device 201 may be configured to transmit a next data packet if the response message of the first device 202-1 received via the first link 205 and the response message of the second device 202-2 received via the second link 210 are both ACKs. For another example, the user device 201 may be configured to determine whether to retransmit the data packet if the response message from the first device 202-1 or the response message from the second device 202-2 indicates NACK. For another example, the user device 201 may be configured to retransmit a data packet if the response message from the first device 202-1 or the response message from the second device 202-2 indicates NACK.

According to an embodiment, the second device 202-2 may transmit, to the first device 202-1 via the third link 215, a response message for the data packet received from the user device 201 via the first link 205. For example, the first device 202-1 may be configured to transmit the response message via the first link 205 based on whether or not the response message of the second device 202-2 received from the second device 202-2 via the third link 215 and the data packet received from the user device 201 via the first link 205 have been successfully received. For example, if the response message of the second device 202-2 received from the second device 202-2 is NACK or if reception of the data packet from the user device 201 via the first link 205 has failed, the first device 202-1 may transmit the response message indicating NACK to the user device 201 via the first link 205. For another example, the first device 202-1 may be configured to determine whether to retransmit the data packet to the second device 202-2 if the first device 202-1 recognizes that the second device 202-2 has failed to receive the data packet from the user device 201 via the first link 205.

Figure 3:
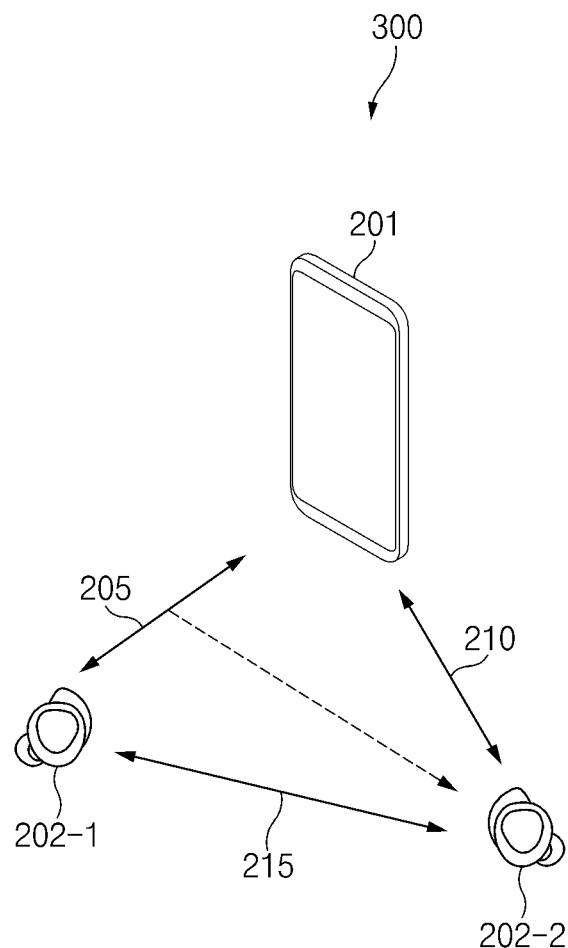
FIG. 3 illustrates electronic devices of a Bluetooth network according to an embodiment.

FIG. 3 illustrates electronic devices of a Bluetooth network 300 according to an embodiment. The electronic device 300 establishes first link 205 with first device 202-1 and second link 201 with second device 202-2. Additionally, first device 202-1 establishes link 215 with second device 202-2. The first device 202-1 may recognize a reception failure of the second device 202-2 of a data packet from user device 201. The first device 202-2 may request the user device 201 to retransmit the data packet. Accordingly, the user device 201 may retransmit the first data packet via the first link 205 or the second link 210 or the first device 202-1 may retransmit the data packet via link 215.

Referring to FIG. 3, for example, the user device 201 may be a portable electronic device (e.g., a smartphone). The first device 202-1 and the second device 202-2 may be wireless earphones or wireless earbuds constituting a single set. For example, the user device 201 may transmit audio data to the first device 202-1 via the first link 205. The first device 202-1 and the second device 202-2 may be configured to output the audio data received from the user device 201 via the first link 205. For another example, the first device 202-1 and/or the second device 202-2 may receive an audio signal from the user device 201, such as a voice call, and may transmit audio data corresponding to the received audio signal to the user device 201.

For example, a data packet transmitted by the user device 201 may be received by only the first device 202-1 or the second device 202-2. For example, the first device 202-1 may be present within coverage of the user device 201, but the second device 202-2 may be located outside the coverage of the user device 201. Hereinafter, for convenience, it is assumed that the second device 202-2 has failed to receive a data packet, but embodiments of the present disclosure are not limited thereto.

According to an embodiment, the first device 202-1 may cognize a reception failure of the second device 202-2. For example, the first device 202-1 may recognize the reception failure of the second device 202-2 if the first device 202-1 receives a response message indicating NACK from the second device 202-2 via the third link 215 or fails to receive a response message within a specified time. For another example, the first device 202-1 may recognize the reception failure of the second device 202-2 by receiving a response message indicating NACK, which has been transmitted from the second device 202-2 to the user device 201, via the first link 205. In response to the reception failure of the second device 202-2, the first device 202-1 may request the user device 201 to retransmit a data packet. For example, the first device 202-1 may request the user device 201 to retransmit a data packet by transmitting a response message indicating NACK via the first link 205.

According to an embodiment, the user device 201 may recognize a transmission failure of data transmitted via the first link 205. For example, the user device 201 may recognize the transmission failure of data if the user device 201 receives a response message indicating NACK from the second device 202-2 via the first link 205 or fails to receive a response message within a specified time. For another example, the user device 201 may recognize the transmission failure of data by receiving a response message indicating NACK, which has been transmitted from the first device 202-1, via the first link 205.

According to certain embodiments, the user device 201 or the first device 202-1 may retransmit a data packet in response to the reception failure of the second device 202-2. For example, the user device 201 may retransmit a data packet via the first link 205 or the second link 210. For example, the first device 202-1 may retransmit a data packet to the second device 202-2 via the third link 215.

There may be a limitation on a method for the user device 201 or the first device 202-1 to retransmit a data packet to the second device 202-2. For example, when the second device 202-2 is located outside the coverage (e.g., the first link 205) from the user device 201, the user device 202-2 may fail to receive a data packet even if retransmission from the user device 201 is repeated. For another example, when the first device 202-1 retransmits a data packet to the second device 202-2, battery consumption of the first device 202-1 may increase due to the retransmission of the data packet. According to certain embodiments of the present disclosure, the electronic devices of the present disclosure may support efficient retransmission of a data packet.

Figure 4:
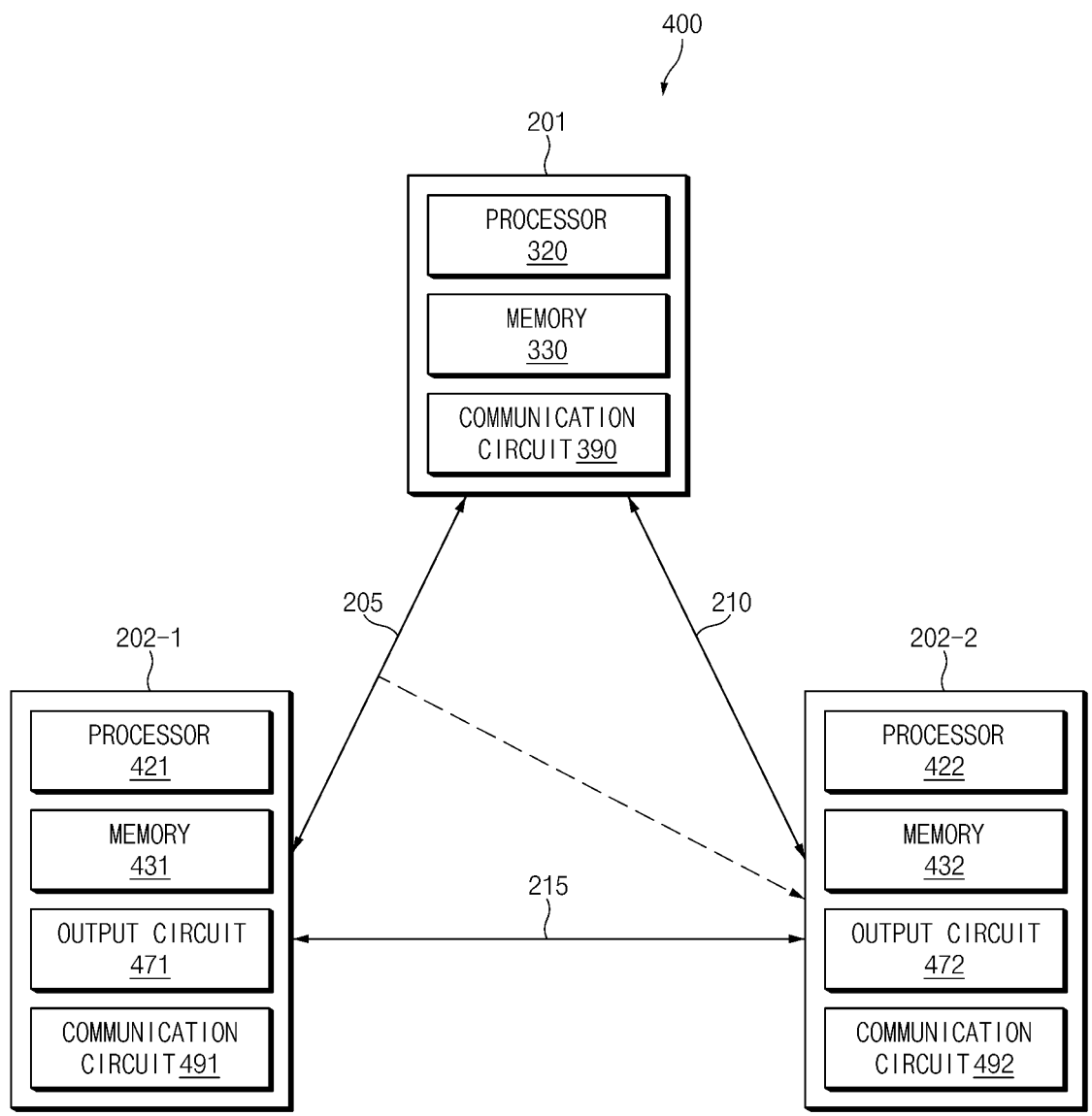
FIG. 4 is a block diagram illustrating an electronic devices according to an embodiment.

FIG. 4 is a block diagram illustrating an electronic devices according to an embodiment. When the second device 202-2 does not receive the packet, the user device 201 determines whether the user device 201 or the first device 202-1 retransmits the packet to the second device 202-2. The user device 201 determines whether the user device 201 or the first device 202-1 retransmits the data packet based on a variety of factors, such as status information at the user device, the first device 202-1, communication quality of first link 205, and communication quality of second link 210.

According to certain embodiments, various electronic devices (e.g., the user device 201, the first device 202-1, and the second device 202-2) disclosed in the present disclosure may include at least some of the components of the electronic device (e.g., the electronic device 101 of FIG. 1) described above with reference to FIG. 1.

According to certain embodiments, the user device 201 may include a processor 320 (e.g., the processor 120 of FIG. 1), a memory 330 (e.g., the memory 130 of FIG. 1), and a communication circuit 390 (e.g., the communication module 190 of FIG. 1). The processor 320 may be operatively connected to the communication circuit 390 and the memory 330. The memory 330 may store one or more instructions that, when executed, cause the processor 320 to perform various operations of the user device 201. The communication circuit 390 may be configured to support wireless communication based on a Bluetooth protocol (e.g., legacy Bluetooth and/or BLE). The user device 201 may further include a configuration not illustrated in FIG. 4. For example, the user device 201 may further include a display (e.g., the display device 160 of FIG. 1), an audio input/output device (e.g., the audio module 170 of FIG. 1), and/or a housing.

The user device 201 may transmit a data packet via the first link 205. According to an embodiment, the user device 201 may identify a data packet reception failure of the second device 202-2. For example, the user device 201 may identify the data packet reception failure of the second device 202-2 based on reception of a response message (e.g., ACK or NACK) for a data packet received by the first device 202-1 via the first link 205. In this case, the response message may indicate that the second device 202-2 has failed to receive a data packet.

When the first device 202-1 has successfully received a data packet, but the second device 202-2 has not, the first device 202-1 may transmit a response message to the user device 201. The first device 202-1 recognizes that the second device 202-2 has not received a data packet but has received the response message indicating the data packet reception failure of the second device 202-2 via the third link 215. In response, the first device 202-1 may transmit a response message indicating that the second device 202-2 has failed to receive a data packet via the first link 205. For example, the first device 202-1 may transmit, to the user device 201, the response message indicating that the second device 202-2 has failed to receive a data packet by setting a value of a specific field in the response message. For another example, the user device 201 may identify the data packet reception failure of the second device 202-2 using a response message (e.g., ACK or NACK) for a data packet received via the second link 210. In this case, the response message may indicate that the second device 202-2 has failed to receive a data packet.

When the second device 202-2 has failed to receive a data packet, the second device 202-2 may transmit the response message indicating a data packet reception failure via the second link 210. When the second link 210 is omitted, the user device 201 may identify the data packet reception failure of the second device 202-2 based on a response message received via the first link 205. The response message may have a value indicating that the second device 202-2 has failed to receive a data packet. The response message may be transmitted by the first device 202-1 or the second device 202-2 to the user device 201 via the first link 205.

When the user device 201 has recognized the data packet reception failure of the first device 202-1 or has recognized the data packet reception failure of the first device 202-1 and the second device 202-2, the user device 201 may retransmit a data packet via the first link 205.

When the user device 201 has recognized the data packet reception failure of the second device 202-2, the user device 201 may determine whether to retransmit a data packet or request the first device 202-1 to retransmit the packet based on device status information (e.g., status information about the user device 201 and/or the first device 202-1) and/or communication quality. For example, when the user device 201 has recognized a data packet reception success of the first device 202-1 and the data packet reception failure of the second device 202-2, the user device 201 may determine a device that is to perform a data packet retransmission operation, based on device status information (e.g., status information about the user device 201 and/or the first device 202-1) and/or communication quality.

According to an embodiment, the user device 201 may determine a device that is to perform a data packet retransmission operation, based on device status information. For example, the device status information may include at least one of a battery level of the user device 201, a charging status of the user device 201, a usage status (e.g., program execution status or wireless communication status) of the user device 201, a battery level of the first device 202-1, or a status (e.g., setting or worn status) of the first device 202-1 and/or the second device 202-2.

According to an embodiment, the user device 201 may determine not to perform data packet retransmission by the user device 201 if the battery level of the user device 201 is equal to or lower than a specified level. In this case, the user device 201 may determine the first device 202-1 as a device that is to perform a data packet retransmission operation. If the battery level of the user device 201 exceeds the specified level, the user device 201 may determine to perform data packet retransmission by the user device 201.

According to an embodiment, the user device 201 may determine retransmission by the user device 201 when the user device 201 is being charged. For example, when the user device 201 is being charged, the user device 201 may determine retransmission by the user device 201 regardless of the battery level of the user device 201.

According to an embodiment, the user device 201 may determine a device that is to perform a data packet retransmission operation, based on a wireless communication status. For example, the user device 201 may determine not to perform data packet retransmission by the user device 201 if the user device 201 performs wireless communication at the same band as Bluetooth, such as Wi-Fi. In this case, the user device 201 may determine retransmission of a data packet by the first device 202-1. If the user device 201 does not perform wireless communication at the same band as Bluetooth, the user device 201 may determine retransmission of a data packet by the user device 201.

According to an embodiment, the user device 201 may determine a device that is to perform a data packet retransmission operation, based on the battery level of the first device 202-1 and the battery level of the user device 201. For example, the battery level of the user device 201 may be compared with the battery level of the first device 202-1. If the battery level of the first device 202-1 is lower than the battery level of the user device 201, the user device 201 may determine that the user device 201 should perform data packet retransmission.

According to an embodiment, the user device 201 may determine a device that is to perform a data packet retransmission operation, based on a program execution status. For example, the user device 201 may determine not to perform data packet retransmission by the user device 201 if the user device 201 is executing a program that consumes a large amount of battery power, such as game or video playback.

According to an embodiment, the user device 201 may determine whether to retransmit a data packet based on a setting (e.g., voice output setting) of the first device 202-1 and/or the second device 202-2. For example, the user device 201 may determine not to perform a data packet retransmission operation if the second device 202-2 is set to a non-output status (e.g., a mute status or a status of output volume 0). For another example, the user device 201 may determine retransmission of a data packet by the first device 202-1 if the first device 202-1 is set to a non-output status.

Whether to retransmit a data packet may be determined based on a worn status of the first device 202-1 and/or the second device 202-2. For example, if the first device 202-1 is in a worn status and the second device 202-2 is in a non-worn status, the user device 201 may determine not to perform data packet retransmission with regard to the second device 202-2. For another example, if the first device 202-1 is in a non-worn status and only the second device 202-2 is in a worn status, the user device 201 may determine to perform data packet retransmission by the user device 201 with regard to the second device 202-2.

According to an embodiment, the user device 201 may determine whether to retransmit a data packet based on communication quality. For example, the user device 201 may determine whether to retransmit a data packet based on communication quality of the first link 205. The user device 201 may determine retransmission of a data packet by the user device 201 if the communication quality of the first link 205 is at least specified quality. The user device 201 may determine retransmission of a data packet by the first device 202-1 if the communication quality of the first link 205 is less than the specified quality. For another example, the user device 201 may determine a device that is to perform a data packet retransmission operation based on the communication quality of the third link 215. The user device 201 may receive information about the communication quality of the third link 215 from the first device 202-1. The user device 201 may determine retransmission of a data packet by the first device 202-1 if the communication quality of the third link 215 is at least specified quality. For another example, the user device 201 may determine whether to retransmit a data packet based on the communication quality of the first link 205 monitored by the second device 202-2. The user device 201 may receive, from the first device 202-1, information about the communication quality of the first link 205 monitored by the second device 202-2. If the communication quality of the first link 205 monitored by the second device 202-2 is at least specified first quality and the communication quality of the first link 205 monitored by the user device 201 and the first device 202-1 is less than specified second quality, the user device 201 may determine that data packet retransmission by the first device 202-1 is impossible and may determine the user device 201 as a device that is to perform a data packet retransmission operation.

For example, the user device 201 may determine communication quality based on a received signal strength, response message, and/or error rate of a corresponding link (e.g., the first link 205 or the third link 215). The user device 201 may determine that the communication quality is at least specified quality if the received signal strength associated with the corresponding link is at least a specified strength. The user device 201 may determine the communication quality based on an ACK/NACK ratio of a response message associated with the corresponding link. The user device 201 may determine that the communication quality of the corresponding link is at least specified quality if the ratio of NACK to ACK is less than a specified value. The user device 201 may determine that the communication quality of the corresponding link is at least specified quality if the error rate of the corresponding link is less than a specified rate.

According to an embodiment, the user device 201 may determine a device that is to perform a data packet retransmission operation, based on device status information and communication quality. For example, the user device 201 may determine data packet retransmission by the user device 201 if both the device status information and the communication quality indicate data packet retransmission by the user device 201. For another example, the user device 201 may determine data packet retransmission by the first device 202-1 if both the device status information and the communication quality indicate data packet retransmission by the first device 202-1. For another example, the user device 201 may determine an entity that is to perform data packet retransmission based on a specified priority order if only one of the device status information and the communication quality indicates retransmission by the user device 201.

According to an embodiment, if data packet retransmission by the user device 201 is determined, the user device 201 may retransmit a data packet via the first link 201.

According to an embodiment, if data packet retransmission by the first device 202-1 is determined, the user device 201 may request the first device 202-1 to retransmit a data packet. For example, the user device 201 may transmit, to the first device 202-1 via the first link 205, a signal for instructing data retransmission to the second device 202-2. For another example, the user device 201 may exchange a role with the first device 202-1 to request retransmission. In this case, the user device 201 may allow the first device 202-1 to operate as a master device or source device of the first link 205. For another example, the user device 201 may control the first device 202-1 so that the first device 202-1 may perform an operation associated with retransmission of a data packet.

According to certain embodiments, the first device 202-1 may include a processor 421 (e.g., the processor 120 of FIG. 1), a memory 431 (e.g., the memory 130 of FIG. 1), an output circuit 471 (e.g., the audio module 170 of FIG. 1), and a communication circuit 491 (e.g., the communication module 190 of FIG. 1). The processor 421 may be operatively connected to the communication circuit 491, the output circuit 471, and the memory 431. The output circuit 471 may be configured to output sound. The memory 431 may store one or more instructions that, when executed, cause the processor 421 to perform various operations of the first device 202-1. The first device 202-1 may further include a configuration not illustrated in FIG. 4. For example, the first device 202-1 may further include an indicator (e.g., the display device 160 of FIG. 1), an audio input device (e.g., the audio module 170), an input interface (e.g., the interface 177 of FIG. 1), and/or a housing. For another example, the first device 202-1 may further include a sensor (e.g., a proximity sensor and/or a pulse sensor) configured to detect whether or not the first device 202-1 is worn.

The first device 202-1 may receive a data packet from the user device 201 via the first link 205. According to an embodiment, the first device 202-1 may identify a data packet reception failure of the second device 202-2. For example, the first device 202-1 may identify the data packet reception failure of the second device 202-2 by monitoring (or receiving) a response message (e.g., NACK) for a data packet transmitted from the second device 202-2 via the first link 205. For another example, the first device 202-1 may identify the data packet reception failure of the second device 202-2 by receiving a response message for a data packet transmitted from the second device 202-2 via the third link 215. For another example, the first device 202-1 may identify the data packet reception failure of the second device 202-2 if a response message (e.g., ACK or NACK) is not received from the second device 202-2 within a specified time after a data packet is received. For another example, the first device 202-1 may identify the data packet reception failure of the second device 202-2 by transmitting, to the second device 202-2 via the third link 215, a signal for inquiring about whether a data packet transmitted via the first link 205 has been received and by receiving a signal that responds to the inquiry from the second device 202-2.

According to certain embodiments, when the first device 202-1 has recognized the data packet reception failure of the second device 202-2 or has received a retransmission request from the user device 201, the first device 202-1 may determine whether to retransmit a data packet based on device status information (e.g., status information about the user device 201 and/or the first device 202-1) and/or communication quality. For example, when the first device 202-1 has successfully received a data packet via the first link, but has recognized the data packet reception failure of the second device 202-2, the first device 202-1 may determine whether to perform a data packet retransmission operation.

According to an embodiment, the first device 202-1 may determine whether to retransmit a data packet based on the device status information. For example, the first device 202-1 may determine whether to retransmit a data packet based on at least one of a battery level of the first device 202-1, a usage status (e.g., wireless communication status) of the user device 201, a communication status of the first device 202-1, or a status (e.g., setting, charging, and/or worn status) of the first device 202-1 and/or the second device 202-2.

The first device 202-1 may determine not to perform data packet retransmission by the first device 202-1 if the battery level of the first device 202-1 is equal to or lower than a specified level. In this case, the first device 202-1 may determine retransmission of a data packet by the user device 201. The first device 202-1 may determine retransmission of a data packet by the first device 202-1 if the battery level of the first device 202-1 exceeds the specified level.

The first device 202-1 may determine whether to retransmit a data packet based on status information about the user device 201. For example, the first device 202-1 may receive, from the user device 201, information indicating whether a frequency band for retransmitting a data packet is available for the user device 201. The user device 201 may transfer, to the first device 202-1, information about availability of a time resource (e.g., time slot) and/or the number of connections to other devices using the same frequency band. If the user device 201 is able to use a corresponding frequency band (e.g., if the number of connections is less than a specified number and a time resource is available), the first device 202-1 may determine data packet retransmission by the user device 201. If the user device 201 is not able to use a corresponding frequency band (e.g., if the number of connections is at least a specified number or a time resource is not available), the first device 202-1 may determine data packet retransmission by the first device 202-1.

The first device 202-1 may determine whether to retransmit a data packet based on the communication status of the first device 202-1. The first device 202-1 may determine whether to retransmit a data packet based on availability of the communication circuit 491 of the first device 202-1. If the first device 202-1 has established a communication link with an additional external electronic device (not shown) (e.g., another source device), the first device 202-1 may determine not to perform data packet retransmission by the first device 202-1. In this case, the first device 202-1 may determine retransmission of a data packet by the user device 201. When the first device 202-1 performs a scan operation for additional connection to another device, the first device 202-1 may determine not to perform data packet retransmission by the first device 202-1. In this case, the first device 202-1 may determine retransmission of a data packet by the user device 201. If the first device 202-1 is performing communication (e.g., Wi-Fi communication) using a communication band which overlaps a Bluetooth communication band, the first device 202-1 may determine not to perform data packet retransmission by the first device 202-1. In this case, the first device 202-1 may determine retransmission of a data packet by the user device 201.

The first device 202-1 may determine whether to retransmit a data packet based on a setting (e.g., voice output setting) of the first device 202-1 and/or the second device 202-2. For example, the first device 202-1 may determine not to perform data packet retransmission if the second device 202-2 is set to a non-output status (e.g., a mute status or a status of output volume 0). For another example, the first device 202-1 may determine retransmission of a data packet by the first device 202-1 if the first device 202-1 is set to a non-output status. For another example, the first device 202-1 may determine retransmission of a data packet further based on a battery status if the first device 202-1 is set to a non-output status. The first device 202-1 may determine retransmission of a data packet by the first device 202-1 if the battery status of the first device 202-1 is at least a specified level and the first device 202-1 is set to a non-output status.

The first device 202-1 may determine whether to retransmit a data packet based on a worn status of the first device 202-1 and/or the second device 202-2. For example, the first device 202-1 may determine not to perform data packet retransmission if the second device 202-2 is in a non-worn status. For another example, the first device 202-1 may determine not to perform retransmission of a data packet by the first device 202-1 if the first device 202-1 is in a non-worn status. For another example, the first device 202-1 may determine retransmission of a data packet by the first device 202-1 if the first device 202-1 is in a non-worn status and in a charging status.

According to an embodiment, the first device 202-1 may determine whether to retransmit a data packet based on communication quality. The first device 202-1 may determine whether to retransmit a data packet based on the communication quality of the first link 205 and/or the third link 215. For example, the first device 202-1 may determine whether to retransmit a data packet based on the communication quality of the first link 205. If the communication quality of the first link 205 measured by the first device 202-1 is at least specified first quality and the communication quality of the first link 205 monitored by the second device 202-2 is less than specified second quality, the first device 202-1 may determine data packet retransmission by the first device 202-1. For another example, if the communication quality of the first link 205 measured by the first device 202-1 is less than third quality and the communication quality of the first link 205 monitored by the second device 202-2 is at least fourth quality, the first device 202-1 may determine data packet retransmission by the user device 201. For another example, the first device 202-1 may determine retransmission of a data packet by the first device 202-1 if the communication quality of the third link 215 is at least specified quality. The first device 202-1 may determine retransmission of a data packet by the user device 201 if the communication quality of the third link 215 is less than the specified quality.

For example, the first device 202-1 may determine communication quality based on a received signal strength, response message, and/or error rate of a corresponding link (e.g., the first link 205 or the third link 215). The first device 202-1 may determine that the communication quality is at least specified quality if the received signal strength associated with the corresponding link is at least a specified strength. For example, the first device 202-1 may determine the communication quality of the first link 205 based on a reception strength (e.g., received signal strength indicator (RSSI) value) of a data packet received from the user device 201. For example, the first device 202-1 may determine the communication quality of the third link 215 based on the reception strength of a data packet received from the second device 202-2. The first device 202-1 may determine the communication quality based on an ACK/NACK ratio of a response message associated with the corresponding link. The first device 202-1 may determine that the communication quality of the corresponding link is at least specified quality if the ratio of NACK to ACK is less than a specified value. For example, the first device 202-1 may determine the communication quality based on the ACK/NACK ratio of a response message received from the user device 201. For another example, the first device 202-1 may determine the communication quality based on the ACK/NACK ratio of a response message received from the second device 202-2. The first device 202-1 may determine that the communication quality of the corresponding link is at least specified quality if the error rate of the corresponding link is less than a specified rate. For example, the first device 202-1 may determine the communication quality of the first link 205 based on the error rate of a data packet received from the user device 201. For another example, the first device 202-1 may determine the communication quality of the third link 215 based on the error rate of a data packet received from the second device 202-2.

According to an embodiment, the first device 202-1 may determine whether to retransmit a data packet based on device status information and communication quality. For example, the first device 202-1 may determine data packet retransmission by the first device 202-1 if both the device status information and the communication quality indicate data packet retransmission by the first device 202-1. For another example, the first device 202-1 may determine data packet retransmission by the user device 201 if both the device status information and the communication quality indicate data packet retransmission by the user device 201.

According to an embodiment, if data packet retransmission by the user device 201 is determined, the first device 202-1 may request, via the first link 205, the user device 201 to retransmit a data packet. For example, the first device 202-1 may transmit a response message indicating NACK to the user device 201. For another example, the first device 202-1 may transmit, to the user device 201, a signal for instructing execution of a retransmission operation. For another example, the first device 202-1 may transmit an ID packet to the user device 201 to request the user device 201 to retransmit. For another example, the first device 202-1 may control the user device 201 so that the user device 201 may perform an operation associated with retransmission of a data packet. The user device 201 may retransmit a data packet via the first link 205 in response to a request from the first device 202-1.

According to an embodiment, if data packet retransmission by the first device 202-1 is determined, the first device 202-1 may retransmit a data packet to the second device 202-2 via the third link 215. For example, the first device 202-1 may transmit an acknowledgement (ACK) of a data packet to the user device 201 to prevent the user device 201 from retransmitting, and may retransmit a data packet to the second device 202-2 via the third link 215.

For example, when the first device 202-1 retransmits a data packet, the first device 202-1 may transmit, to the user device 201, confirmation of reception (e.g., ACK) of a data packet and a response message for instructing temporary suspension of subsequent data packet transmission. For example, the first device 202-1 may instruct the user device 201 to suspend or resume transmission of a subsequent data packet by setting a value of a FLOW field (e.g., the FLOW 1205 of FIG. 12) of a packet header.

For example, in order to retransmit a data packet to the second device 202-2, the first device 202-1 may transmit, to the user device 201, a signal for instructing suspension of transmission of a subsequent data packet. After transmitting the signal for instructing suspension of transmission of a subsequent data packet, the first device 202-1 may retransmit a data packet to the second device 202-2 via the third link 215. For example, upon receiving an acknowledgement of a retransmitted data packet from the second device 202-2, the first device 202-1 may transmit, to the user device 201, a signal for instructing resumption of transmission of a subsequent data packet. For another example, if a negative acknowledgement (NACK) for a retransmitted data packet is received from the second device 202-2 or a response is not received within a specified time, the first device 202-1 may re-perform retransmission of a data packet to the second device 202-2.

According to an embodiment, the first device 202-1 may retransmit a data without determining whether to retransmit a data packet. For example, the first device 202-1 may retransmit a data packet to the second device 202-2 via the third link 215 if the first device 202-1 has recognized a data packet reception failure of the second device 202-2 or has received a retransmission request from the user device 201. In this case, the first device 202-1 may control the user device 201 so that the user device 201 may not transmit a subsequent data packet in order to retransmit a data packet.

According to certain embodiments, the second device 202-2 may include a processor 422 (e.g., the processor 120 of FIG. 1), a memory 432 (e.g., the memory 130 of FIG. 1), an output circuit 472 (e.g., the audio module 170 of FIG. 1), and a communication circuit 492 (e.g., the communication module 190 of FIG. 1). The processor 422 may be operatively connected to the communication circuit 492, the output circuit 472, and the memory 432. The output circuit 472 may be configured to output sound. The memory 432 may store one or more instructions that, when executed, cause the processor 422 to perform various operations of the second device 202-2. The second device 202-2 may further include a configuration not illustrated in FIG. 4. For example, the second device 202-2 may further include an indicator (e.g., the display device 160 of FIG. 1), an audio input device (e.g., the audio module 170), an input interface (e.g., the interface 177 of FIG. 1), and/or a housing. For another example, the second device 202-2 may further include a sensor (e.g., a proximity sensor and/or a pulse sensor) configured to detect whether or not the second device 202-2 is worn.

According to an embodiment, the second device 202-2 may monitor the first link 205 using information associated with the first link 205. The second device 202-2 may be configured to receive a data packet transmitted by the user device 201 via the first link 205 by monitoring the first link 205. The second device 202-2 may transmit a result of monitoring (e.g., ACK/NACK) the first link 205. For example, when the second device 202-2 has failed to receive a data packet via the first link 205, the second device 202-2 may request the first device 202-1 to retransmit a data packet via the third link 215. For example, the second device 202-2 may transmit a response message indicating NACK to the first device 202-1 to request retransmission of a data packet. The second device 202-2 may receive a data packet retransmitted from the user device 201 via the first link 205, or may receive a data packet retransmitted from the first device 202-1 via the third link 215. For example, when the second device 202-2 has received a data packet retransmitted via the first link 205, the second device 202-2 may transmit, via the first link 205 or the third link 215, a response message indicating whether a data packet is received. For another example, when the second device 202-2 has received a data packet retransmitted via the third link 215, the second device 202-2 may transmit, via the third link 215, a response message indicating whether a data packet is received.

According to certain embodiments, the first device 202-1 may include the communication circuit 491 (e.g., wireless communication circuit) configured to support Bluetooth communication, the processor 421 operatively connected to the communication circuit 491, and the memory 431 operatively connected to the processor. The memory 431 may store instructions that, when executed, cause the processor 421 to perform the operations of the first device 202-1 described below.

The first device 202-1 may receive first data transmitted via the first link 205 from the user device 201, and may monitor the third link 215 for a response to the first data from the second device. If the response is not received or the response indicates negative acknowledgement (NACK), the first device 202-1 may determine that the user device 201 or the first device 202-1 should retransmit the first data to the second device 202-2 based on at least one of status information about the first device 202-1, status information about the user device 201, communication quality of the first link 205, or communication quality of the third link 215.

For example, the status information about the first device 202-1 may include the battery level of the first device 202-1. If the battery level is at least a specified level, the first device 202-1 may determine that the first device 202-1 should retransmit the first data to the second device 202-2 via the third link 215. If the battery level is less than the specified level, the first device 202-1 may determine that the user device 201 should retransmit the first data via the first link 205.

The first device 202-1 may receive, from the user device 201, information about the communication quality of the first link 205 measured by the second device 202-2. If the received information about the communication quality of the first link 205 indicates that the communication quality is equal to or less than specified communication quality, the first device 202-1 may determine that the first device 202-1 should retransmit the first data via the third link 215.

The first device 202-1 may identify the communication quality of the third link 215 based on at least one of a received signal strength, acknowledgement (ACK)-negative acknowledgement (NACK) ratio, or error rate associated with the third link 215. If the communication quality of the third link 215 is at least specified quality, the first device 202-1 may retransmit the first data to the second device 202-2 via the third link 215.

When it is determined that the user device 201 should retransmit the first data, the first device 202-1 may transmit, to the user device 201 via the first link 205, a signal for instructing retransmission of the first data. The request signal may indicate NACK for the first data.

If it is determined that the first device 202-1 should retransmit the first data, the first device 202-1 may transmit a first response signal indicating ACK of the first data to the user device 201 via the first link 205, and may retransmit the first data to the second device 202-2 via the third link 215. The first response signal may include information that instructs suspension of transmission of second data subsequent to the first data. The first device 202-1 may receive ACK from the second device in response to retransmission of the first data via the third link 215, and may transmit a second response signal to the user device 201 via the first link 205 in response to the reception of the ACK. The second response signal may include information that instructs transmission of the second data.

A method for retransmitting data of the first device 202-1 may include: creating the first link 205 with the user device 201 using a wireless communication circuit (e.g., the communication circuit 491) of the first device 202-1; creating the third link 215 with the second device 202-2 using the wireless communication circuit; receiving first data transmitted via the first link 205 from the user device; monitoring the third link 215 for a response to the first data from the second device 202-2; and determining that the user device 201 or the first device 202-1 should retransmit the first data to the second device 202-2 based on at least one of status information about the first device 202-1, status information about the user device 201, communication quality of the first link 205, or communication quality of the third link 215 if the response is not received or indicates negative acknowledgement (NACK).

The determining that the user device 201 or the first device 202-1 should retransmit the first data to the second device 202-2 may include: determining that the first device 202-1 should retransmit the first data to the second device 202-2 via the third link 215 if a battery level of the first device 202-1 indicated by the status information about the first device 202-1 is at least a specified level; and determining that the user device 201 should retransmit the first data via the first link 205 if the battery level is less than the specified level.

The determining that the user device 201 or the first device 202-1 should retransmit the first data to the second device 202-2 may include: receiving, from the second device 202-2, information about the communication quality of the first link 205 measured by the second device 202-2; and determining that the first device 202-1 should retransmit the first data via the third link 215 if the received information about the communication quality of the first link 205 indicates that the communication quality is equal to or less than specified communication quality.

The determining that the user device 201 or the first device 202-1 should retransmit the first data to the second device 202-2 may include: identifying the communication quality of the third link 215 based on at least one of a received signal strength, acknowledgement (ACK)-negative acknowledgement (NACK) ratio, or error rate associated with the third link 215; and determining that the first device 202-1 should retransmit the first data to the second device 202-2 via the third link 215 if the communication quality of the third link 215 is at least specified quality.

The method may further include: transmitting a first response signal indicating ACK of the first data to the user device 201 via the first link 205 when it is determined that the first device 202-1 should retransmit the first data; and retransmitting the first data to the second device 202-2 via the third link 215. The first response signal may include information that instructs suspension of transmission of second data subsequent to the first data.

The method may further include transmitting a second response signal to the user device 201 via the first link 205 when ACK is received from the second device 202-2 in response to transmission of the first data via the third link

215. The second response signal may include information that instructs transmission of the second data.

According to certain embodiments, the user device 201 may include the communication circuit 390 (e.g., wireless communication circuit) configured to support Bluetooth communication, the processor 320 operatively connected to the communication circuit 390, and the memory 330 operatively connected to the processor 320. The memory 330 may store instructions that, when executed, cause the processor 320 to perform the operations of the user device 201 described below.

The user device 201 may create the first link 205 with the first device 202-1 using the communication circuit 390, and may create the second link 210 with the second device 202-2 using the communication circuit 390. The user device 201 may transmit first data to the first device 202-1 via the first link 205, and may receive, from the first device 202-1 via the first link 205, a first response indicating acknowledgement (ACK) of the first data. The user device 201 may receive, from the second device 202-2 via the second link 210, a second response indicating negative ACK (NACK) for the first data. In this case, the user device 201 may determine that the first device 202-1 or the user device 201 should retransmit the first data to the second device 202-2 based on at least one of status information about the user device 201 or communication quality of the first link 205. The status information about the user device 201 may include a battery level of the user device 201. The user device 201 may determine that the user device 201 should retransmit the first data via the first link 205 when the battery level is at least a specified level, and may determine that the first device 202-1 should retransmit the first data via the third link 215 between the first device 202-1 and the second device 202-2 when the battery level is less than the specified level.

The user device 201 may receive, from the first device 202-1, information about the communication quality of the first link 205 measured by the second device 202-2, and may determine that the first device 202-1 should retransmit the first data to the second device 202-2 via the third link 215 when the received information about the communication quality of the first link 205 indicates that the communication quality is equal to or less than specified communication quality.

The user device 201 may identify the communication quality of the first link 205 based on at least one of a received signal strength, acknowledgement (ACK)-negative acknowledgement (NACK) ratio, or error rate associated with the first link 205, and the user device 201 may retransmit the first data via the first link 205 when the communication quality is at least specified quality.

When it is determined that the first device 202-1 should retransmit the first data, the user device 201 may transmit, to the first device 202-1 via the first link 205, a signal for instructing retransmission of the first data.

Figure 5:
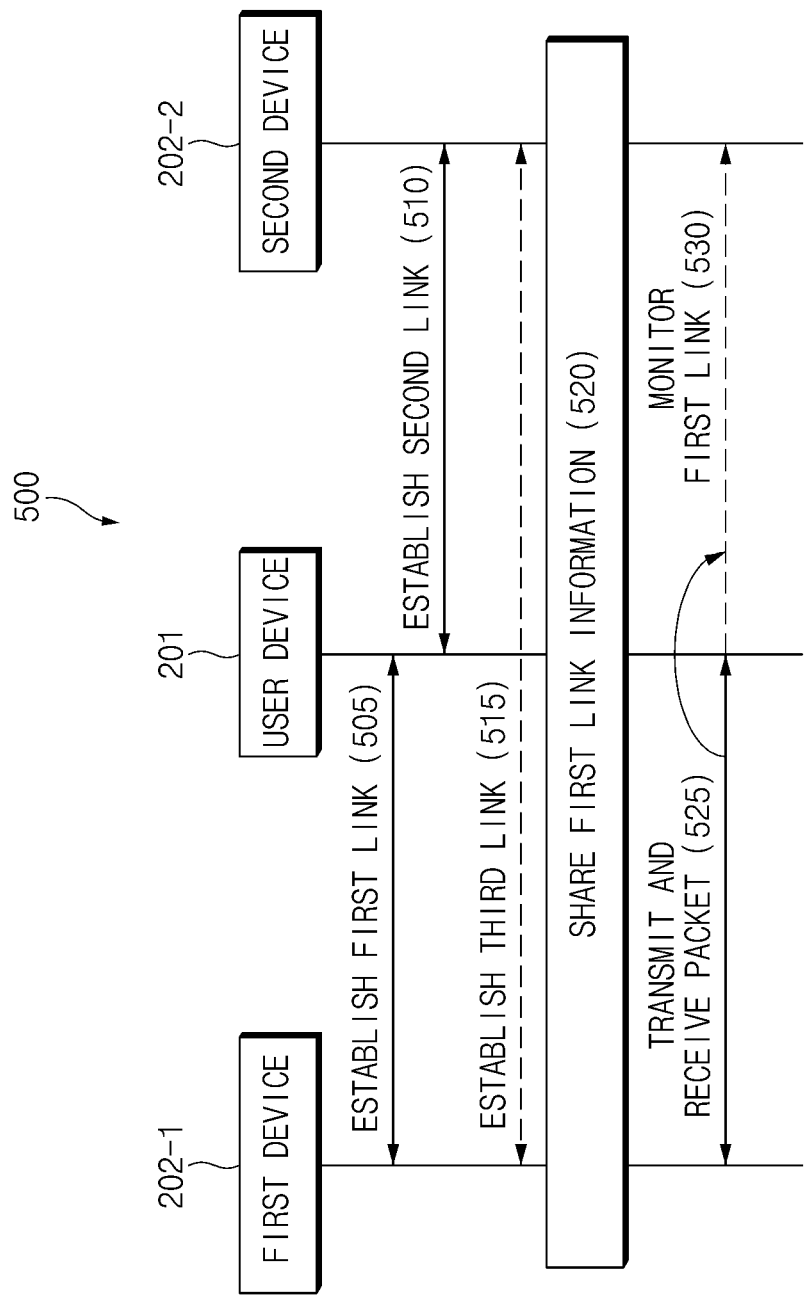
FIG. 5 is a signal flow diagram for communication between electronic devices according to certain embodiments.

FIG. 5 is a signal flow diagram 500 for communication between electronic devices according to certain embodiments.

Referring to FIG. 5, in operation 505, the user device 201 may establish a first link (e.g., the first link 205 of FIG. 2) with the first device 202-1.

In operation 510, the user device 201 may establish a second link (e.g., the second link 210 of FIG. 2) with the second device 202-2. The establishment of the second link 210 is exemplary, and embodiments of the present disclosure are not limited thereto. For example, the user device 201 and the second device 202-2 may establish the second link 210 before the establishment of the first link 205 (e.g., operation 505). For example, the second link 210 may be released after sharing first link information (e.g., operation 520). For another example, the establishment of the second link 210 (e.g., operation 510) may be skipped.

In operation 515, the first device 202-1 and the second device 202-2 may establish the third link (e.g., the third link 215 of FIG. 2). The establishment of the third link 215 is exemplary, and embodiments of the present disclosure are not limited thereto. For example, the first device 202-1 and the second device 202-2 may establish the third link 215 before the establishment of the first link 205 (e.g., operation 505). For another example, the first device 202-1 and the second device 202-2 may establish the third link 215 before the establishment of the second link 210 (e.g., operation 510). For another example, the first device 202-1 and the second device 202-2 may establish the third link 215 substantially simultaneously with the establishment of the first link 205 or the establishment of the second link 210.

In operation 520, information associated with the first link 205 may be shared with the second device 202-2. According to an embodiment, the user device 201 or the first device 202-1 may share the information associated with the first link 205 with the second device 202-2. For example, the first device 202-1 may transmit, to the second device 202-2, information associated with the first link 205 via the third link 215. For another example, the user device 201 may transmit the information associated with the first link 205 to the second device 202-2 via the second link 210. For another example, the user device 201 or the first device 202-1 may transmit the information associated with the first link 205 to the second device 202-2 via an external server (e.g., the external server 203 of FIG. 2) or via an external electronic device (e.g., charging cases of the first device 202-1 and the second device 202-2). According to an embodiment, the user device 201 or the first device 202-1 may determine whether to share the information associated with the first link 205. For example, if the information associated with the first link 205 is determined to be shared, the user device 201 or the first device 202-1 may transmit the information associated with the first link 205 to the second device 202-2. The information associated with the first link 205 may include, for example, at least one of address information, clock information, channel information, SDP result information, information about supported functions, key information, or EIR packets.

In operation 525 and operation 530, the user device 201 may transmit a data packet (e.g., the first data packet) including content to the first device 202-1 via the first link 205. The second device 202-2 may monitor the first link 205 based on at least a part (e.g., address information or clock information) of the information associated with the first link 205. The second device 202-2 may receive the same data packet as the data packet (e.g., the first data packet or the second data packet) received by the first device 202-1 through monitoring. Operation 530 may be referred to as shadowing, listening, or snooping.

According to certain embodiments, each of the first link 205, the second link 210, and the third link 215 may be a link based on a Bluetooth legacy protocol or a BLE protocol.

Figure 6:
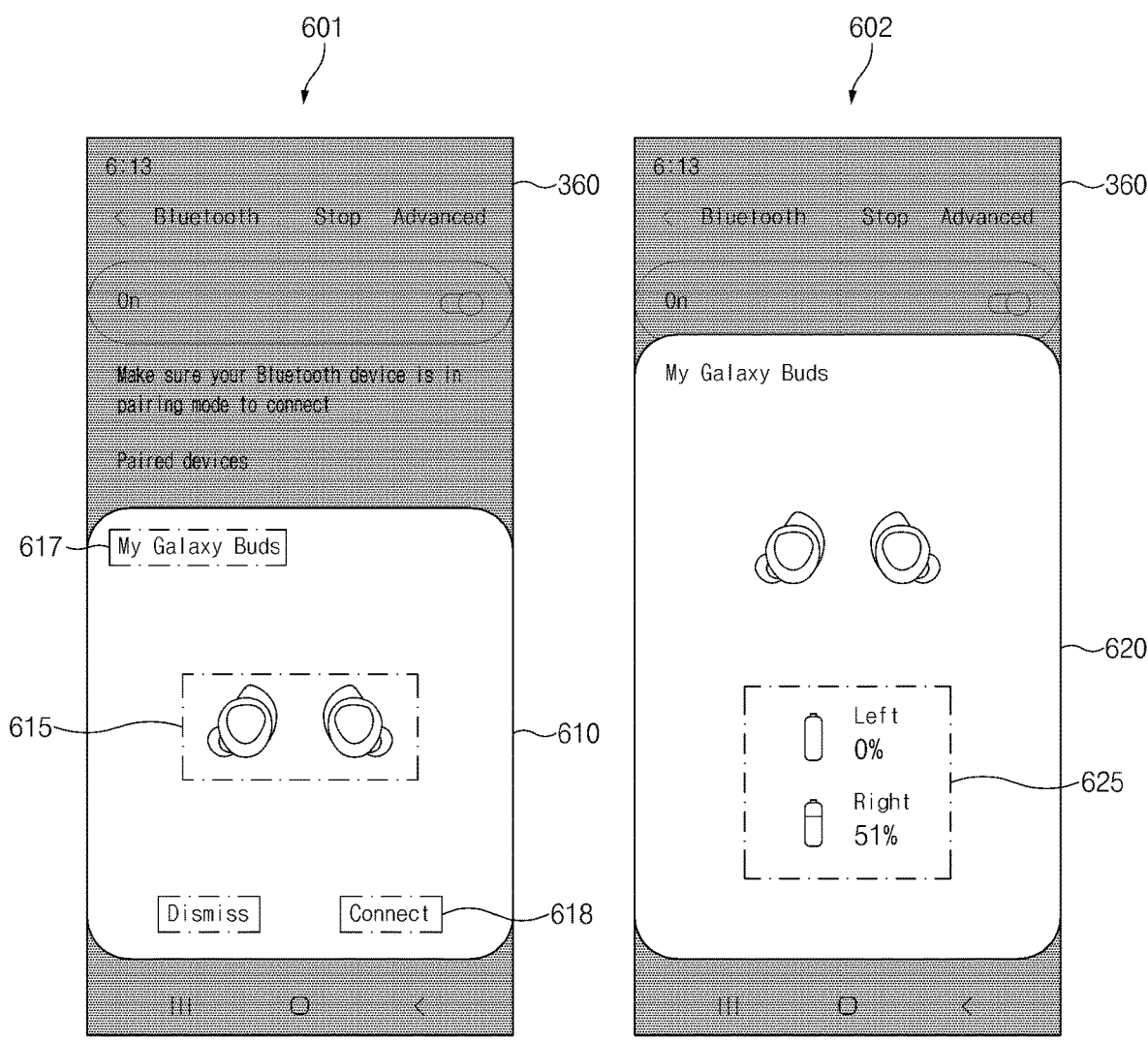
FIG. 6 is a diagram illustrating user interfaces (UI) showing connections of devices in a Bluetooth network environment according to an embodiment.

For example, operation 505 may be performed based on input to the user device 201. FIG. 6 is a diagram illustrating user interfaces (UI) showing connections of devices in the Bluetooth network environment according to certain embodiments.

FIG. 6 illustrates an embodiment in which the first device 202-1 and the second device 202-2 are configured as a set, but the same principle may be applied to user interface showing only that the user device 201 is connected with the first device 202-1. Screen 601 shows the user UI for pairing the user device 201 with the first device 202-1 and second device 202-2. Screen 602 shows the UI providing device status information, e.g., the remaining capacity 625.

Referring to FIG. 6, at reference numeral 601, the user device 201 may recognize the first device 202-1 by receiving an advertising signal transmitted from the first device 202-1, and may output, through a display 360 of the user device 201, a first user interface 610 for informing a user of the recognized first device 202-1 and the second device 202-2 that forms a set with the first device 202-1.

The first user interface 610 may include, for example, at least one of an object 615 representing shapes or otherwise indicative of the first device 202-1 and the second device 202-2 or a text 617 indicating the device names (e.g., My Galaxy Buds) of the first device 202-1 and the second device 202-2. For another example, although not illustrated in FIG. 6, the first user interface 610 may indicate whether or not the first device 202-1 or the second device 202-2 has a history of being previously connected.

According to an embodiment, the advertising signal may include information for connecting (or pairing) the user device 201 and the first device 202-1. For example, the advertising signal may include at least one of identification information of the first device 202-1, user account information, current pairing information indicating whether or not the first device 202-1 is being paired with another device, a paring list indicating a list of devices with which the first device 202-1 has been previously paired, simultaneous pairing information indicating devices capable of pairing with the first device 202-1 simultaneously, transmission power, sensing area, or battery status information. For another example, if the first device 202-1 forms a set with the second device 202-2, the advertising signal may further include at least one of identification information of the second device 202-2, user account information, current pairing information indicating whether or not the second device 202-2 is being paired with another device, a paring list indicating a list of devices with which the second device 202-2 has been previously paired, simultaneous pairing information indicating devices capable of pairing with the second device 202-2 simultaneously, transmission power, sensing area, or battery status information.

According to an embodiment, the first device 202-1 may transmit the advertising signal through a multicast method or a broadcast method.

According to an embodiment, the first device 202-1 may transmit the advertising signal according to a specified condition. For example, the first device 202-1 may transmit the advertising signal in response to detecting that the case in which the first device 202-1 is stored is opened. In certain embodiments, the first device 202-1 may include an arm that is unfolded to go over the ear, and the advertising signal can be transmitted in response to the unfolding of the arm. For another example, the first device 202-1 may transmit the advertising signal in response to supply of power or reception of a user input. For another example, the first device 202-1 may transmit the advertising signal every specified period.

According to an embodiment, the user device 201 may establish (e.g., operation 505 of FIG. 5) the first link (e.g., the first link 205 of FIG. 2) with the first device 202-1, in response to receiving the user input 618 requesting connection with the first device 202-1 or automatically without the user input. According to an embodiment, the user device 201 and the first device 202-1 may establish the first link 205 according to a procedure based on a Bluetooth standard. For example, the user device 201 and the first device 202-1 may perform a baseband page procedure for recognizing a counterpart device, a link manager protocol (LMP) procedure for identifying an LMP version, a clock offset, and supported functions (e.g., supported features), a host request/response procedure for verifying connection, an authentication procedure for confirming whether or not the counterpart device is trustable, an encryption procedure, and a setup complete procedure for notifying a host of completion of connection (e.g., the first link 205).

Once the first link 205 is established, as in reference numeral 602, the user device 201 may output, through the display 360, a second user interface 620 indicating that the first device 202-1 is connected to the user device 201. The second user interface 620 may further include, for example, an image 325 showing the battery status of the first electronic device 202-1 and the second device 202-2 forming the set with the first device 202-1.

Although not illustrated in FIG. 6, according to an embodiment, if the first device 202-1 is discovered while the user device 201 is already connected to an external device other than the first device 202-1 and the second device 202-2, the user device 201 may transmit, to the first device 202-1 or the second device 202-2, information about a link that is already connected such that the first device 202-1 or the second device 202-2 may monitor the link that is already connected between the user device 201 and the external device. In this case, the first user interface 610 may include information indicating that the first device 202-1 or the second device 202-2 may be added. If a user input requesting addition of the first device 202-1 or the second device 202-2 is received, the user device 201 may transmit, to the first device 202-1 or the second device 202-2, the information about the link that is already connected.

Figure 7:
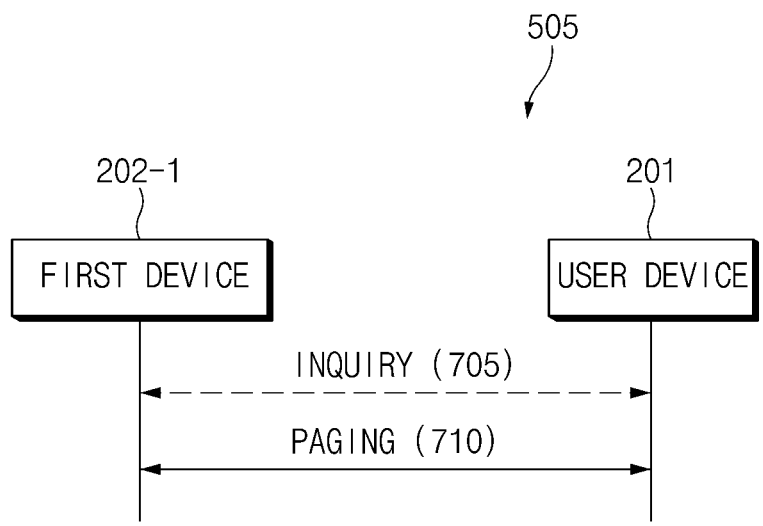
FIG. 7 is a signal flow diagram for connection of a first link according to an embodiment.
Figure 8:
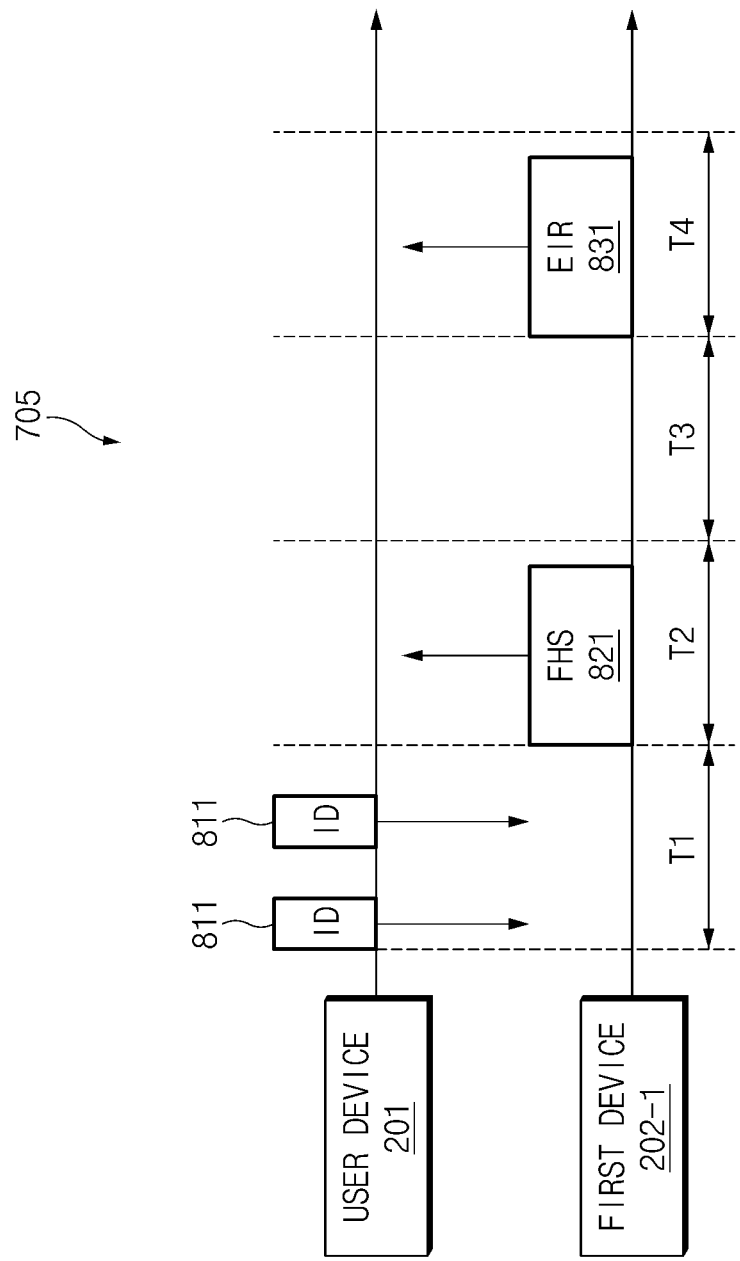
FIG. 8 is a diagram illustrating a packet exchange for performing an inquiry according to an embodiment.
Figure 9:
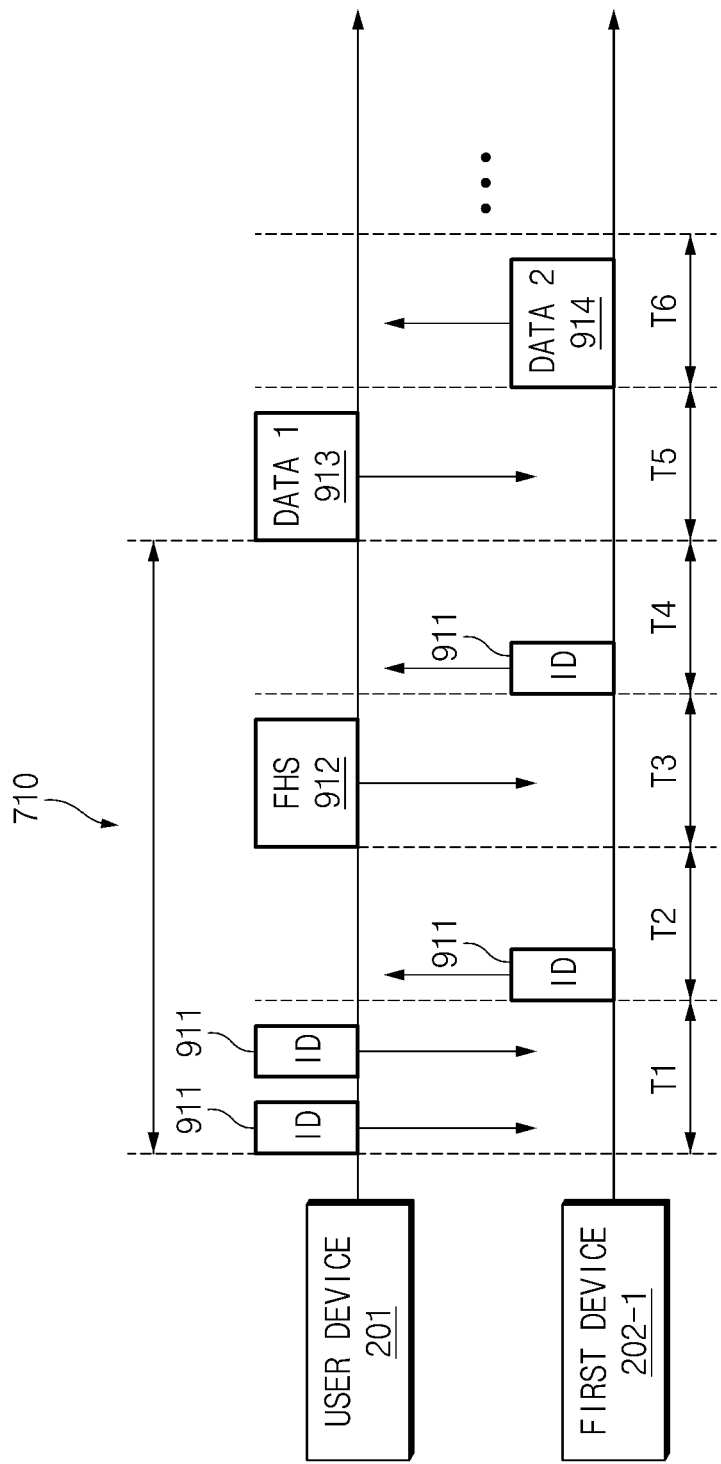
FIG. 9 is a diagram illustrating a packet exchange for performing paging according to an embodiment.

Certain embodiments can be practiced with the Bluetooth Legacy Protocol, while certain embodiments can be practiced with the BLE Protocol. FIGS. 7-9 describe an embodiment using the Bluetooth Legacy Protocol, while FIGS. 10-11 describe an embodiment using the BLE Protocol.

Bluetooth Legacy Protocol

Hereinafter, with reference to FIGS. 7, 8, and 9, a connection and communication method based on the Bluetooth legacy protocol will be described. Hereinafter, a connection and communication method based on the Bluetooth legacy protocol will be described based on the first link 205, but the following descriptions may be similarly applied to the second link 210 and/or the third link 215.

FIG. 7 is a signal flow diagram for connection of the first link 205 according to an embodiment. For example, operation 705 and/or operation 710 of FIG. 7 may be included in an operation (e.g., operation 505) of establishing the first link 205 of FIG. 5 that includes inquiry (operation 705) and pairing (operation 710).

In operation 705, the first device 202-1 and the user device 201 may perform an inquiry. Through the inquiry, the first device 202-1 or the user device 201 may recognize a surrounding external electronic device. For example, a user of the user device 201 may operate the user device 201 in a search mode for a Bluetooth communication connection. The user may enable the user device 201 to perform an inquiry procedure by turning on the Bluetooth of the user device 201 and allowing the user device 201 to enter a pairing mode. According to an embodiment, if the user device 201 already has the information of the first device 202-1, the inquiry (e.g., operation 705) may be skipped.

FIG. 8 is a diagram illustrating a packet exchange for performing an inquiry (e.g., operation 705) according to an embodiment of the disclosure. In the example of FIG. 8, the user device 201 may be a device that performs an inquiry, and the first device 202-1 may be a device that performs an inquiry scan. However, embodiments of the present disclosure are not limited thereto. For example, the first device 202-1 may perform the inquiry and the user device 201 may perform the inquiry scan.

Referring to FIG. 8, the user device 201 and the first device 202-1 may communicate based on a time interval (e.g., a time slot). For example, each time interval may correspond to a time slot (e.g., 625 μs) of a specified length.

In a first time interval T1, the user device 201 may periodically transmit an identity (ID) packet 811. For example, the user device 201 may generate the ID packet 811 based on a general inquiry access code (GIAC). For example, the first time interval T1 may be a time interval set to allow the user device 201 to transmit a signal to the first device 202-1. The ID packet 811 may include, for example, a device access code (DAC) or an inquiry access code (IAC) of the user device 201. According to an embodiment, the ID packet 811 may be transmitted during a specified interval (e.g., 68 μs). According to an embodiment, in order to establish a link with the user device 201, the first device 202-1 may activate a communication circuit (e.g., at least a portion of the communication circuit 491 of FIG. 4), and may receive the ID packet 811 by listening in a first slot T1.

In a second time interval T2, the first device 202-1 may transmit a frequency hop synchronization (FHS) packet 821 to the user device 201. For example, the first device 202-1 may transmit the FHS packet 821 in response to receiving the ID packet 811. The FHS packet 821 may include control information (e.g., clock information or address information) for establishing the first link 205. For example, the FHS packet 821 may include the Bluetooth address of the first device 202-1 that performs the inquiry scan. The FHS packet 821 may include information indicating the type of the first device 202-1 (e.g., class of device), extended inquiry response (EIR) bits indicating a subsequent packet, and/or clock information.

In the example of FIG. 8, the user device 201 and the first device 202-1 may be configured to alternately transmit signals at every time interval. For example, the first time interval T1 and the third time interval T3 may be time intervals set to allow the user device 201 to transmit a signal to the first device 202-1. For example, the second time interval T2 and the fourth time interval T4 may be time intervals set to allow the first device 202-1 to transmit a signal to the user device 201. In the fourth time interval T4, the first device 202-1 may transmit an EIR packet 831 to the user device 201. The EIR packet 831 may include, for example, a device name of the first device 202-1, a transmission power level, a service class universally unique identifiers (UUIDs), and/or manufacturer's data.

Referring back to FIG. 7, in operation 710, the first device 202-1 and the user device 201 may perform paging. The first device 202-1 and the user device 201 may be connected through paging. As described above, if the first device 202-1 and the user device 201 are aware of each other's addresses, the first device 202-1 and the user device 201 may skip the inquiry (operation 705) and perform paging.

FIG. 9 is a diagram illustrating a packet exchange for performing paging according to an embodiment.

Referring to FIG. 9, in the example of FIG. 9, the user device 201 may be a device that performs paging, and the first device 202-1 may be a device that performs a paging scan. However, embodiments of the present disclosure are not limited thereto. For example, the first device 202-1 may perform paging and the user device 201 may perform a paging scan. The user device 201 and the first device 202-1 may communicate based on a time interval (e.g., a time slot). For example, each time interval may correspond to a time slot (e.g., 625 μs) of a specified length. In the example of FIG. 9, odd time intervals T1, T3, and T5 may be time slots set to allow the user device 201 to transmit a signal to the first device 202-1, and even time intervals T2, T4, and T6 may be time slots set to allow the first device 202-1 to transmit a signal to the user device 201.

In the first time interval T1, the user device 201 may periodically transmit an ID packet 911. For example, the user device 201 may transmit the ID packet 911 including the access code of the first device 202-1. For example, the user device 201 may calculate the access code of the first device 202-1 using the Bluetooth address of the first device 202-1. For example, in the first time interval T1, the first device 202-1 may operate in a page scan mode. According to an embodiment, the first device 202-1 may perform a page scan at a specified period.

In the second time interval T2, in response to receiving the ID packet 911, the first device 202-1 may transmit, to the user device 201, the ID packet 911 including the access code of the first device 202-1. In the second time interval T2, the user device 201 may monitor whether or not the ID packet 911 is received from the first device 202-1.

In the third time interval T3, in response to receiving the ID packet 911, the user device 201 may transmit an FHS packet 912. For example, the FHS packet 912 may include the device name, the Bluetooth address, the device class, the service class, and/or the clock information of the user device 201.

In the fourth time interval T4, the first device 202-1 may transmit the ID packet 911 to the user device 201. The first device 202-1 may transmit the ID packet 911 in the fourth time interval T4 in response to receiving the FHS packet 912.

The first link 205 between the user device 201 and the first device 202-1 may be established according to a packet exchange in the first time interval T1 to the fourth time interval T4. For example, the user device 201 may transmit first data 913 to the first device 202-1 in the fifth time interval T5. In the sixth time interval T6, the first device 202-1 may transmit second data 914 to the user device 201. For example, the second data 914 may include a response message (e.g., ACK/NACK) for the first data 913.

BLE Protocol

Hereinafter, with reference to FIGS. 10 and 11, a connection and communication method based on the BLE protocol will be described. Hereinafter, a connection and communication method based on the BLE protocol will be described based on the third link (e.g., the third link 215 of FIG. 2), but the following descriptions may be similarly applied to the first link 205 and/or the second link 210.

Figure 10:
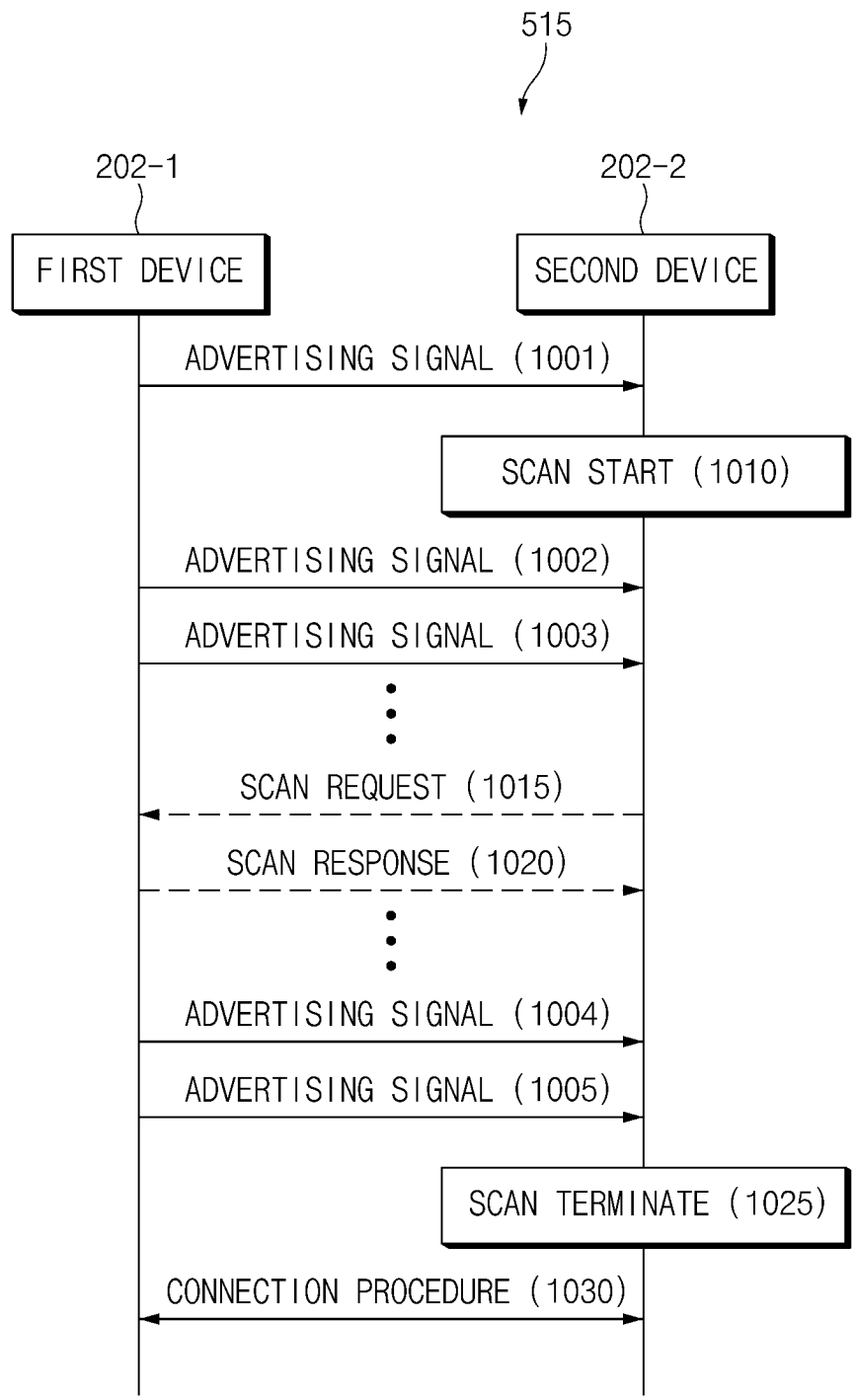
FIG. 10 is a signal flow diagram for connection of a third link according to an embodiment.

FIG. 10 is a signal flow diagram for connection of the third link 215 according to an embodiment. For example, operations of FIG. 10 may be included in the establishment operation (e.g., operation 515) of the third link 215 of FIG. 5. In FIG. 10, the first device 202-1 may periodically transmit an advertising signal including advertising data (e.g., operation 1001 to operation 1005). For example, the advertising signal may include at least one of identification information of the first device 202-1, user account information, device information currently paired with the first device 202-1 (e.g., a pairing list), information about devices capable of simultaneous pairing, transmission power, sensing area, and/or battery status information.

For example, in operation 1010, the second device 202-2 may start to scan, and in operation 1025, the second device 202-2 may terminate the scan.

According to an embodiment, in operation 1015, the second device 202-2 may transmit a scan request to the first device 202-1, and in operation 1020, the first device 202-1 may transmit a scan response to the second device 202-2. For example, in the case of an active scan, the first device 202-1 and the second device 202-2 may perform operations 1015 and 1020. For another example, in the case of a passive scan, operations 1015 and 1020 may be skipped.

In operation 1030, the first device 202-1 and the second device 202-2 may perform a connection procedure. For example, the second device 202-2 may transmit a connection request to the first device 202-1 and the first device 202-1 may transmit a response message to the second device 202-2, thereby connecting the first device 202-1 and the second device 202-2.

Figure 11:
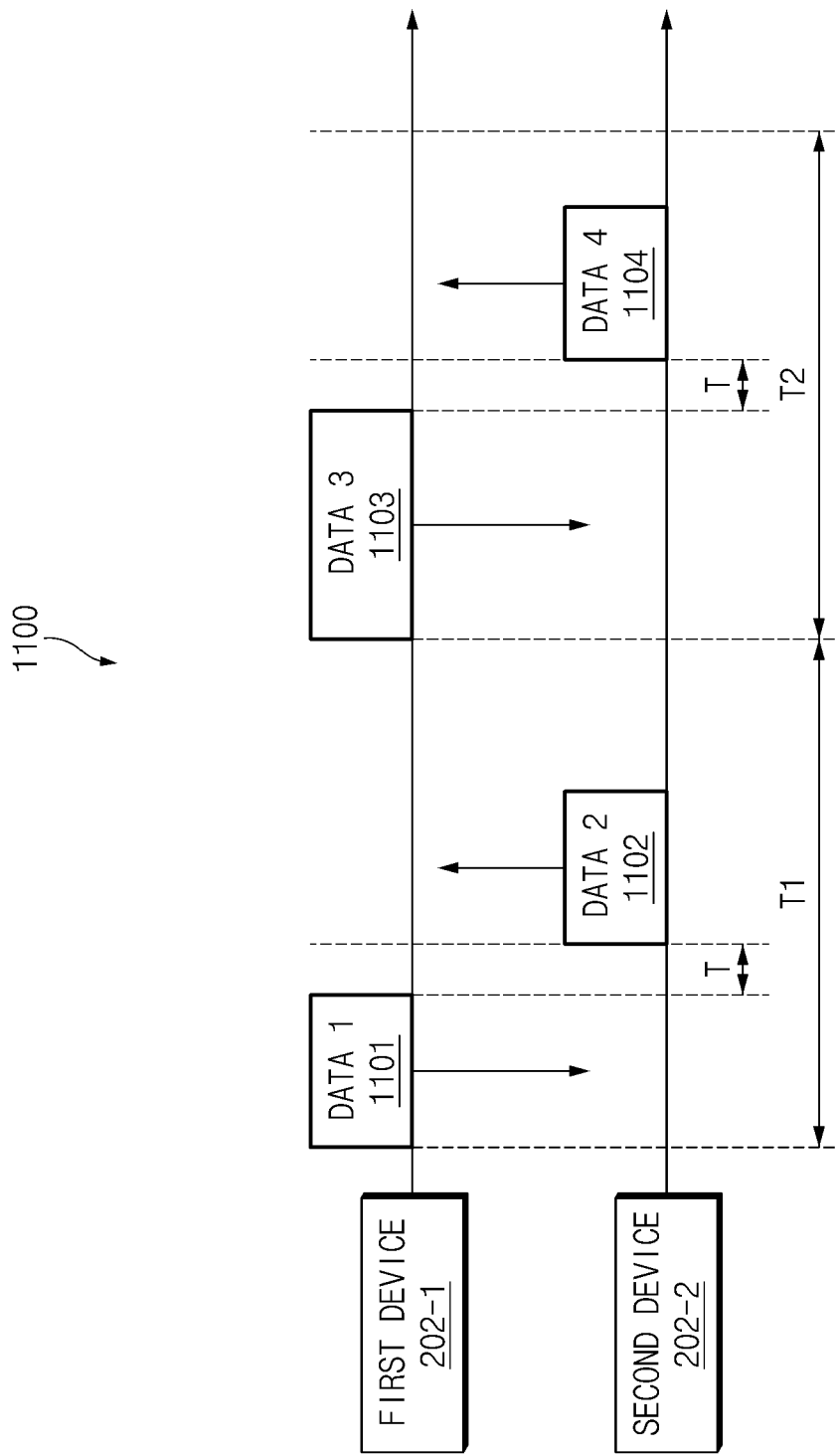
FIG. 11 is a diagram illustrating a packet exchange via the third link according to an embodiment.

FIG. 11 is a diagram illustrating a packet exchange 1100 via the third link 215 according to an embodiment. For example, the first device 202-1 and the second device 202-2 may be configured to transmit and receive signals in one connection interval.

In the first time interval T1, the first device 202-1 may transmit first data 1101 to the second device 202-2. The second device 202-2 may transmit second data 1102 to the first device 202-1 after a specified time T (e.g., inter-frame space) after reception of the first data 1101. Likewise, in the second time interval T2, the first device 202-1 may transmit third data 1103 to the second device 202-2, and after a specified time, the second device 202-2 may transmit fourth data 1104 to the first device 202-1.

Figure 12:
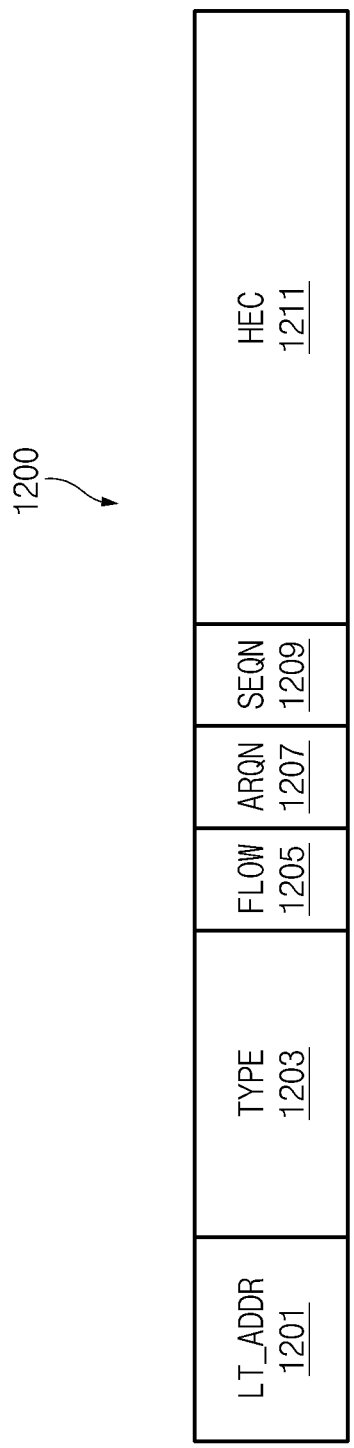
FIG. 12 is a diagram illustrating a structure of a header according to an embodiment.

FIG. 12 is a diagram illustrating a structure of a header 1200 according to an embodiment. For example, according to an embodiment, the header 1200 of a packet according to a Bluetooth standard may include a logical transport address (LT_ADDR) 1201, TYPE 1203, FLOW 1205, ARQN 1207, SEQN 1209, and/or HEC 1211. For example, the LT_ADDR 1201 may include an address of a slave device. For example, the TYPE 1203 may indicate the type of a packet in which the header 1200 is included. For example, the SEQN 1209 may indicate a sequence number for indicating an order of data packet streams. For example, the HEC 1211 may be used to confirm integrity of the header 1200.

For example, the FLOW 1205 may be used to control a packet flow. The FLOW 1205 may have a 1-bit length and may have a first value (e.g., 0) or a second value (e.g., 1). The FLOW 1205 may be used to control a flow of asynchronous connectionless (ACL) data. On an ACL logical link, the FLOW 1205 may be set to a first value (e.g., GO) instructing transmission of data by default. When a receiving end is no longer able to receive ACL data, the FLOW 1205, on the ACL logical link, may be set to a second value (e.g., STOP) instructing suspension of transmission of data. The FLOW 1205 may not be used on a logical link (e.g., synchronous connection oriented (SCO) logical link or extended SCO (eSCO) logical link) other than the ACL logical link. In this case, the FLOW 1205 may be set to the first value, and the receiving end may disregard a setting value of the FLOW 1205. Furthermore, a packet (e.g., ID, POLL, or NULL packet) including only link control information may be transmitted regardless of the value of the FLOW 1205. An electronic device that has received the FLOW 1205 having the second value may temporarily suspend transmission of the ACL data. The electronic device may resume transmission of the ACL data, upon receiving a packet including the FLOW 1205 having the first value from a data receiving electronic device.

For example, the automatic repeat request number (ARQN) 1207 may be used to indicate, to a transmitting end, successful reception of payload data. For example, the ARQN 1207 may have a 1-bit length. The electronic device may transmit ACK/NACK to a remote electronic device using a value of the ARQN 1207. For example, when the electronic device has successfully received data from the remote electronic device, the electronic device may set the value of the ARQN 1207 to a value (e.g., 1) indicating a reception success and transmit (e.g., transmit ACK) the ARQN 1207 to the remote electronic device. For example, when the electronic device has failed to receive data from the remote electronic device, the electronic device may set the value of the ARQN 1207 to a value (e.g., 0) indicating a reception failure and transmit (e.g., transmit NACK) the ARQN 1207 to the remote electronic device.

Figure 13:
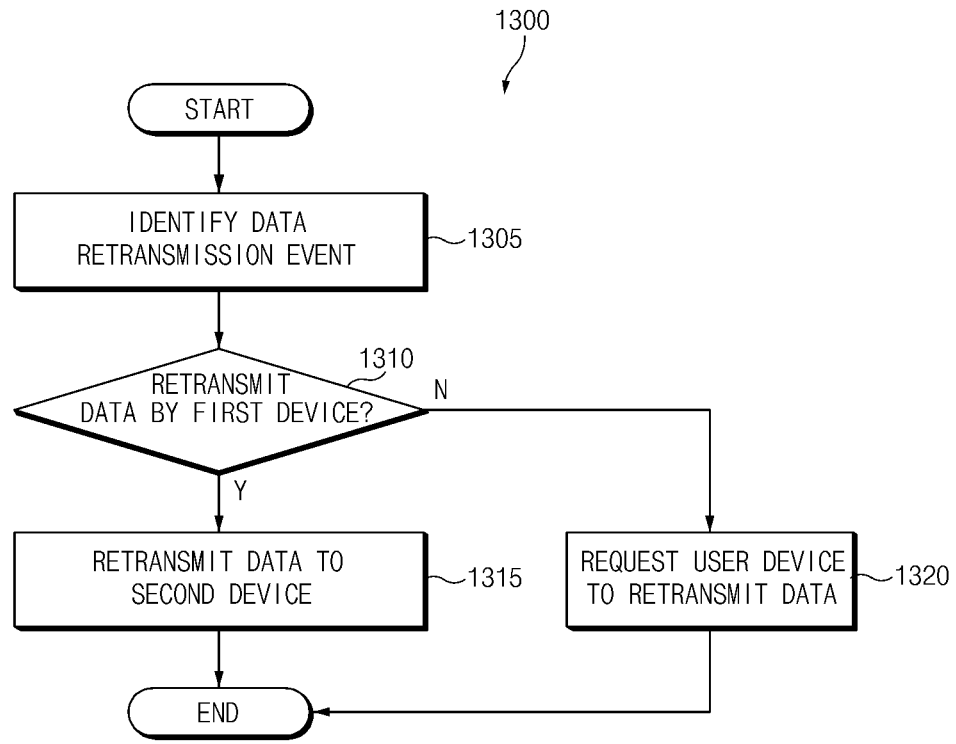
FIG. 13 is a flowchart of a data retransmitting method of a first device according to an embodiment.
Figure 14:
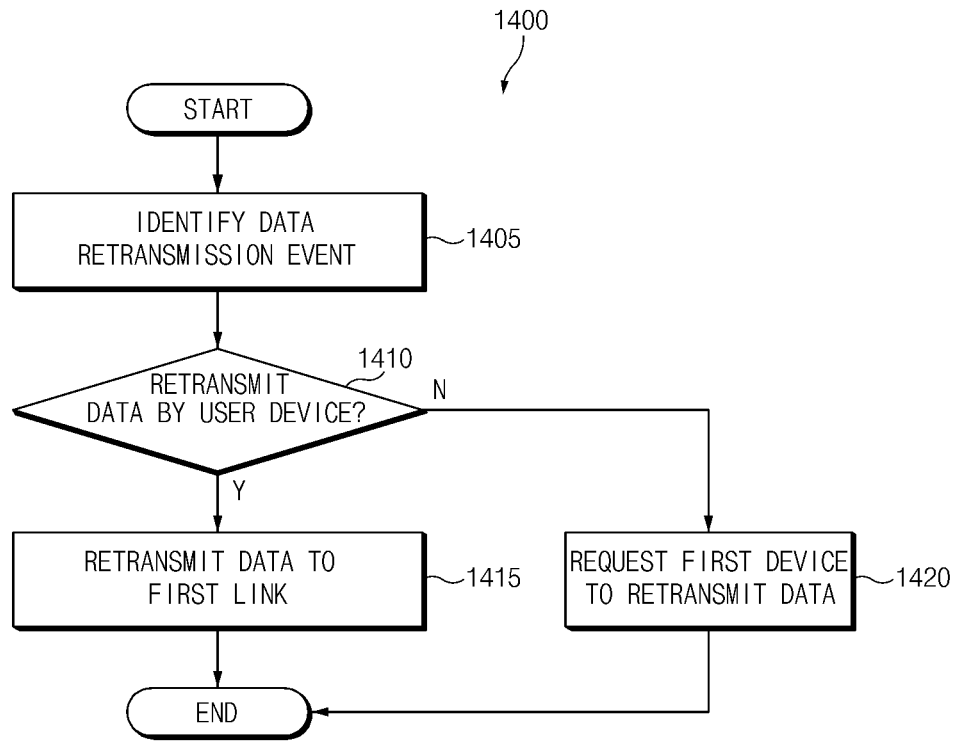
FIG. 14 is a flowchart of a data retransmitting method of a user device according to an embodiment.

FIGS. 13 and 14 teach a method for retransmitting data to a second device 202-2. FIG. 13 describe a method by the first device 202-1 while FIG. 14 describes a method by the user device 201.

As described above with reference to FIG. 3, a user device (e.g., the user device 201 of FIG. 2) or a first device (e.g., the first device 202-1 of FIG. 2) may retransmit data in response to identification of a reception failure of a second device (e.g., the second device 202-2 of FIG. 2). Hereinafter, data retransmitting methods according to certain embodiments of the present disclosure will be described with reference to FIGS. 13 to 16.

FIG. 13 is a flowchart 1300 of a data retransmitting method of a first device (e.g., the first device 202-1 of FIG. 2) according to an embodiment.

The data retransmitting method includes determining whether the first device 201 should retransmit the data or the first device 202-1 should retransmit the data.

In FIG. 13, the first device 202-1 may be in a state in which the a first link (e.g., the first link 205 of FIG. 2) with a user device (e.g., the user device 201 of FIG. 2) and a third link (e.g., the third link 215 of FIG. 3) with a second device (e.g., the second device 202-2 of FIG. 2) are established.

In operation 1305, the first device 202-1 may identify a data retransmission event. The first device 202-1 may identify a data retransmission event by detecting or determining a failure of reception of a data packet by the second device 202-2 via the first link 205. For example, the first device 202-1 may transmit, to the second device 202-2 via the third link 215, a signal for inquiring about whether a data packet has been received. The first device 202-1 may identify a data packet reception failure based on non-response or a signal indicating a data packet reception failure from the second device 202-2 via the third link 215. For another example, the first device 202-1 may identify the data packet reception failure of the second device 202-2 by receiving negative acknowledgement (NACK) for a data packet from the second device 202-2 via the third link 215. For another example, the first device 202-1 may identify a data retransmission event (e.g., data packet reception failure) when a data retransmission request is received from the user device 201.

In operation 1310, the first device 202-1 may determine whether to retransmit data by the first device 202-1 in response to the data retransmission event. According to an embodiment, the first device 202-1 may determine whether to retransmit data by the first device 202-1 based on device status information (e.g., status information about the user device 201 and/or the first device 202-1) and/or communication quality.

According to an embodiment, the first device 202-1 may determine whether to retransmit a data packet based on the device status information. For example, the first device 202-1 may determine whether to retransmit a data packet based on at least one of a battery level of the first device 202-1, a usage status (e.g., wireless communication status) of the user device 201, a communication status of the first device 202-1, or a status (e.g., setting, charging, and/or worn status) of the first device 202-1 and/or the second device 202-2. The first device 202-1 may determine data packet retransmission by the first device 202-1 if the battery level of the first device 202-1 exceeds a specified level. The first device 202-1 may determine whether to retransmit a data packet by the first device 202-1 based on availability (e.g., the number of connections to other devices using the same frequency band as Bluetooth and/or availability of a time resource) of a radio resource (e.g., time and frequency resources) of the user device 201. The first device 202-1 may determine whether to retransmit a data packet by the first device 202-1 based on a communication status (e.g., establishment of a communication link with another electronic device, paging scan, inquiry scan, or Wi-Fi communication status) of the first device 202-1. The first device 202-1 may determine whether to retransmit a data packet based on a setting (e.g., voice output setting) of the first device 202-1 and/or the second device 202-2. The first device 202-1 may determine whether to retransmit a data packet based on a worn status of the first device 202-1 and/or the second device 202-2.

According to an embodiment, the first device 202-1 may determine whether to retransmit a data packet based on communication quality. For example, the first device 202-1 may determine whether to retransmit a data packet based on the communication quality (e.g., received signal strength, ACK/NACK ratio, and/or error rate) of the first link 205 and/or the third link 215.

According to an embodiment, the first device 202-1 may determine whether to retransmit a data packet based on device status information and communication quality. For example, the first device 202-1 may determine data packet retransmission by the first device 202-1 if both the device status information and the communication quality indicate data packet retransmission by the first device 202-1. For another example, the first device 202-1 may determine data packet retransmission by the user device 201 if both the device status information and the communication quality indicate data packet retransmission by the user device 201.

When packet retransmission by the first device 202-1 is determined (e.g., operation 1310-Y), the first device 202-1 may retransmit a data packet to the second device 202-2 via the third link 215 in operation 1315. For example, the first device 202-1 may transmit an acknowledgement (ACK) of a data packet to the user device 201 to prevent the user device 201 from retransmitting, and may retransmit a data packet to the second device 202-2 via the third link 215. For example, the first device 202-1 may transmit, to the user device 201, a signal that instructs suspension of transmission of a subsequent data packet, and may retransmit a data packet to the second device 202-2 via the third link 215.

When it is determined that data retransmission should not be performed by the first device 202-1 (e.g., operation 1310-N), the first device 202-1 may request the user device 201 to retransmit a data packet in operation 1320. For example, the first device 202-1 may request the user device 201 to retransmit a data packet by transmitting, to the user device 201, a response message indicating NACK, a signal for instructing execution of a retransmission operation, or an ID packet.

In the example of FIG. 13, a device that is to perform data retransmission is determined according to identification of a data retransmission event, but this is merely exemplary, and embodiments of the present disclosure are not limited thereto. For example, the first device 202-1 may determine an entity that is to perform data retransmission at an arbitrary time after connecting to the user device 201. For example, when a data retransmission event is identified (e.g., operation 1305), operation 1315 or operation 1320 may be performed according to a previously determined entity for performing data retransmission.

FIG. 14 is a flowchart 1400 of a data retransmitting method of a user device (e.g., the user device 201 of FIG. 2) according to an embodiment.

In FIG. 14, the user device 201 may be in a state in which a first link (e.g., the first link 205 of FIG. 2) with a first device (e.g., the first device 202-1 of FIG. 2) is established.

In operation 1405, the user device 201 may identify a data retransmission event. For example, the user device 201 may identify a data retransmission event by recognizing a data packet reception success of the first device 202-1 and a data packet reception failure of the second device 202-2. The user device 201 may identify a data retransmission event when the user device 201 receives a response message indicating the data packet reception failure of the second device 202-2 via the first link 205 or receives a response message indicating NACK via the second link 210.

In operation 1410, the user device 201 may determine whether to retransmit data by the user device 201 in response to the data retransmission event. According to an embodiment, the user device 201 may determine whether to retransmit data by the user device 201 based on device status information (e.g., status information about the user device 201 and/or the first device 202-1) and/or communication quality.

According to an embodiment, the user device 201 may determine whether to retransmit a data packet based on the device status information. For example, the user device 201 may determine whether to retransmit a data packet based on at least one of a battery level of the user device 201, a charging status of the user device 201, a usage status (e.g., wireless communication status) of the user device 201, or a status (e.g., setting or worn status) of the first device 202-1 and/or the second device 202-2.

According to an embodiment, the user device 201 may determine whether to retransmit a data packet based on communication quality. For example, the user device 201 may determine a device that is to perform a data packet retransmission operation based on the communication quality (e.g., received signal strength, ACK/NACK ratio, and/or error rate) of the first link 205 and/or the third link 215.

When data retransmission by the first device 201 is determined (e.g., operation 1410-Y), the user device 201 may retransmit a data packet via the first link 205 in operation 1415.

When it is determined that data retransmission should not be performed by the user device 201 (e.g., operation 1410-N), the user device 201 may request the first device 202-1 to retransmit a data packet in operation 1420. For example, the user device 201 may transmit a signal for instructing data retransmission to the first device 202-1 via the first link 205. For another example, the user device 201 may exchange a role with the first device 202-1 to request retransmission. In this case, the user device 201 may allow the first device 202-1 to operate as a master device or source device of the first link 205. For another example, the user device 201 may control the first device 202-1 so that the first device 202-1 may perform an operation associated with retransmission of a data packet. In this case, the first device 202-1 may perform an operation associated with retransmission of a data packet before re-changing the role from the first device 202-1 to the user device 201.

In the example of FIG. 14, a device that is to perform data retransmission is determined according to identification of a data retransmission event, but this is merely exemplary, and embodiments of the present disclosure are not limited thereto. For example, the user device 201 may determine an entity that is to perform data retransmission at an arbitrary time after connecting to the first device 202-1. For example, when a data retransmission event is identified (e.g., operation 1405), operation 1415 or operation 1420 may be performed according to a previously determined entity for performing data retransmission.

Figure 15:
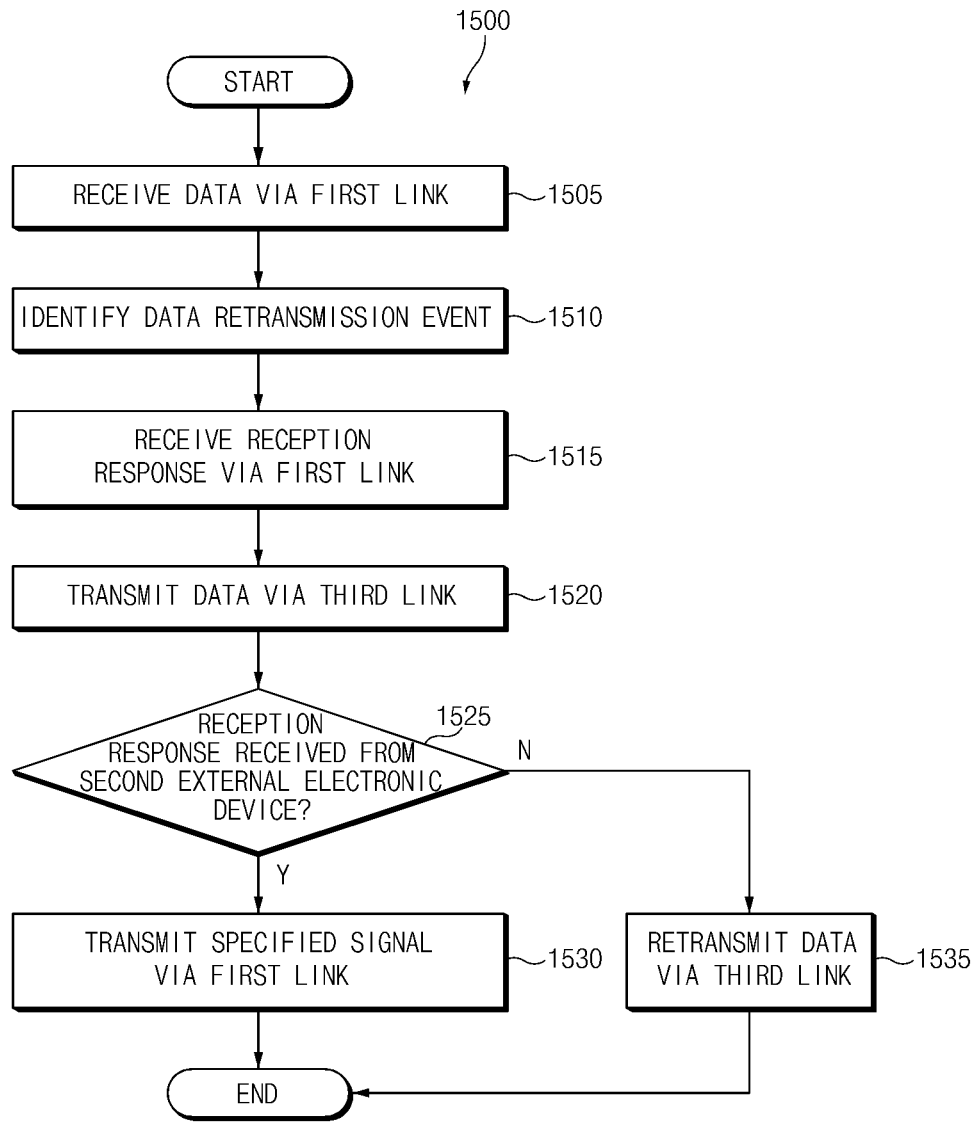
FIG. 15 is a flowchart of a data retransmitting method of a first device.

FIG. 15 is a flowchart 1500 of a data retransmitting method of a first device (e.g., the first device 202-1 of FIG. 2) according to an embodiment.

In FIG. 15, the first device 202-1 may be in a state in which the a first link (e.g., the first link 205 of FIG. 2) with a user device (e.g., the user device 201 of FIG. 2) and a third link (e.g., the third link 215 of FIG. 3) with a second device (e.g., the second device 202-2 of FIG. 2) are established. It has been stated with reference to FIG. 13 that the first device 202-1 may determine whether to perform retransmission in response to a data retransmission event. However, embodiments of the present disclosure are not limited thereto. For example, the first device 202-1 may be configured to retransmit a data packet via the third link 215 when a data retransmission event is identified.

In operation 1505, the first device 202-1 may receive a data packet transmitted by the user device 201 via the first link 205. For example, the data packet may include audio data transmitted by the user device 201.

In operation 1510, the first device 202-1 may identify a data retransmission event. The above descriptions of operation 1305 of FIG. 13 may be referenced for operation 1510.

In operation 1515, the first device 202-1 may transmit a reception response via the first link 205 in response to identification of a data retransmission event. For example, the first device 202-1 may transmit, to the user device 201 via the first link 205, a reception response indicating acknowledgement (ACK). The first device 202-1 may set a value of ARQN (e.g., the ARQN 1207 of FIG. 12) of a packet header to a value (e.g., 1) indicating a reception success. For example, the first device 202-1 may transmit, to the user device 201 via the first link 205, the acknowledgement and a reception response that instructs suspension of transmission of a subsequent packet. The first device 202-1 may set the value of the ARQN 1207 of a packet header to a value indicating a reception success, and may set the value of FLOW (e.g., the FLOW 1205 of FIG. 12) to a value (e.g., 1) indicating suspension of transmission.

In operation 1520, the first device 202-1 may retransmit a data packet to the second device 202-2 via the third link 215.

In operation 1525, the first device 202-1 may determine whether an acknowledgement is received from the second device 202-2. When the acknowledgement of the retransmitted data packet is received (e.g., operation 1525-Y), the first device 202-1 may transmit a specified signal to the user device 201 via the first link 205. For example, the specified signal may be a signal for instructing resumption of transmission of a subsequent packet. In this case, the first device 202-1 may set the value of the FLOW 1205 of a packet header to a value that instructs resumption of transmission. When a negative acknowledgement for the retransmitted data is received or the acknowledgement is not received within a specified time (e.g., operation 1525-N), the first device 202-1 may retransmit a data packet via the third link 215. According to an embodiment, the first device 202-1 may retransmit a data packet to the second device 202-2 via the third link 215 according to a specified number of times or a specified time. For example, the first device 202-1 may attempt to retransmit a data packet to the second device 202-2 according to the specified number of times or the specified time. When the acknowledgement (ACK) for the retransmission is not received from the second device 202-2, the first device 202-1 may request the user device 201 to transmit a subsequent packet after attempting to perform retransmission the specified number of times or after elapse of the specified time.

Figure 16:
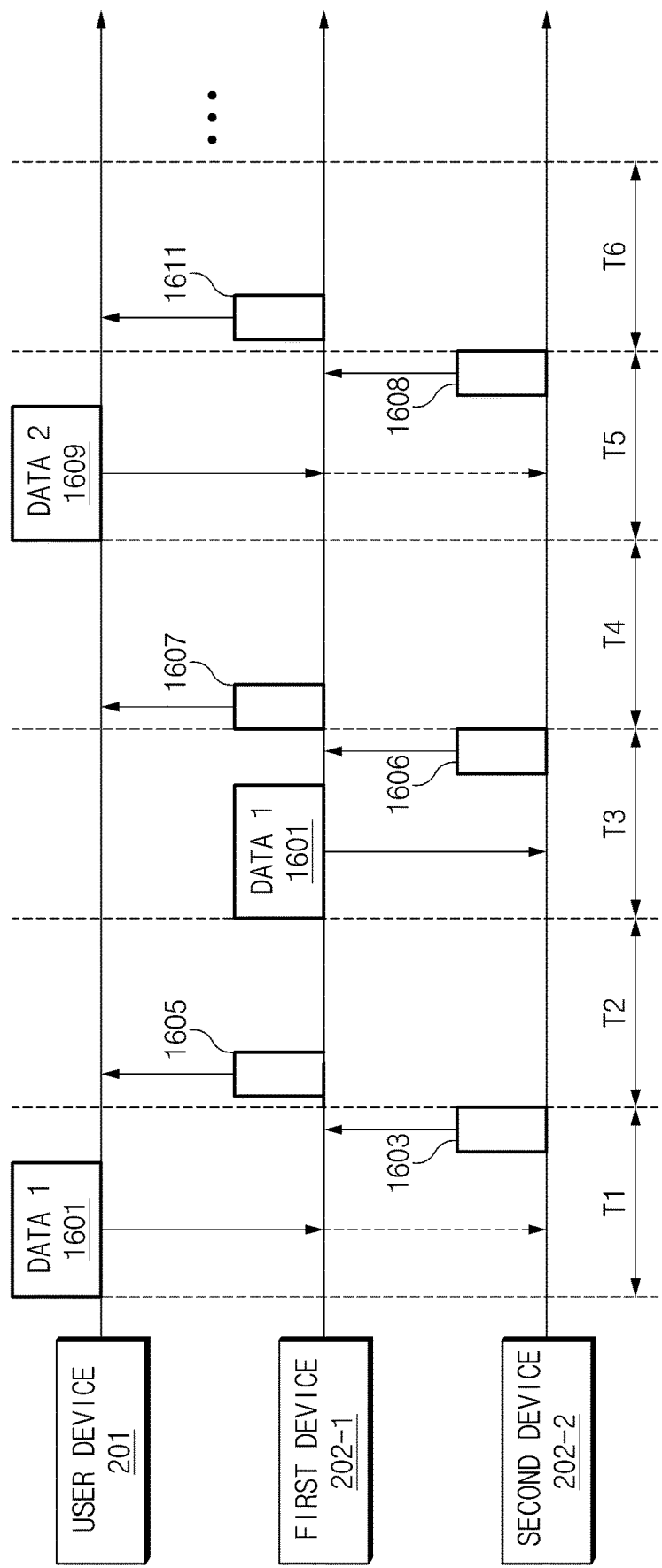
FIG. 16 is a diagram illustrating a packet exchange according to a method of retransmitting data by a first device according to an embodiment.

FIG. 16 is a diagram illustrating a packet exchange according to a method of retransmitting data by a first device according to an embodiment.

In the example of FIG. 16, the second device 202-2 may receive information about a first link (e.g., the first link 205 of FIG. 2), and may monitor the first link 205 using the information about the first link 205. For example, the second device 202-2 may be configured to monitor the first link 205 to transmit a response message (e.g., NACK) before the first device 202-1 or not to transmit an additional response message (e.g., NACK) to the first device 202-1 when reception of data from the user device 201 fails, and to transmit a response message (e.g., ACK) before the first device 202-1 when data is successfully received. According to an embodiment, the first device 202-1 may be configured to retransmit data associated with the first link 205 to the second device 202-2. For example, the first device 202-1 may be configured to retransmit data associated with the first link 205 to the second device 202-2 based on at least one of status information (e.g., a battery level, charging status, or usage status (e.g., wireless communication status)) or communication quality information (e.g., a received signal strength, ACK/NACK ratio, or error rate).

Referring to FIG. 16, in a first time interval T1, the user device 201 may transmit first data 1601 via a first link (e.g., the first link 205 of FIG. 2. In the first time interval T1, the first device 202-1 may successfully receive the first data 1601 via the first link 205.

In the first time interval T1, the second device 202-2 may monitor the first link 205 using information associated with the first link 205, but may fail to receive the first data 1601. The second device 202-2 may transmit, to the first device 202-1 via a third link (e.g., the third link 215 of FIG. 2), a first response signal 1603 indicating whether the first data 1601 is received. In the present example, the first response signal 1603 may indicate a reception failure. For example, the second device 202-2 may transmit the first response signal 1603 before a second time interval T2 begins so that the first response signal 1603 overlaps at least a portion of the second time interval T2, thereby allowing the first device 202-1 to recognize whether the second device 202-2 has received before the first device 202-1 transmits a response signal to the user device 201. For example, the second device 202-2 may use information about the first link 205 to identify a timing (e.g., time slot) at which the user device 201 transmits data (e.g., the first data 1601) via the first link 205. When the second device 202-2 fails to receive data or fails to decode data at the timing at which the user device 201 transmits data via the first link 205, the second device 202-2 may transmit a response signal (e.g., the first response signal 1603) indicating NACK or may transmit no response signal (e.g., packet).

In the second time interval T2, the first device 202-1 may transmit a response signal for the first data 1601 after a specified time interval after the second time interval T2 begins. The first device 202-1 may identify occurrence of a retransmission event when the first device 202-1 receives a negative acknowledgement (NACK) from the second device 202-2 via the third link 215 or is unable to receive an acknowledgement (ACK) during the specified time interval. The first device 202-1 may transmit a second response signal 1605 to the user device 201 in response to the occurrence of the retransmission event. For example, the second response signal 1605 may include an acknowledgement (ACK) and a packet header instructing suspension of transmission of subsequent data (e.g., second data 1609). In the second time interval T2, the user device 201 may suspend transmission of subsequent data until an additional signal is received, based on the second response signal 1605 received from the first device 202-1. For example, the first device 202-1 may transmit the second response signal 1605 if data retransmission by the first device 202-1 is determined. For another example, the first device 202-1 may transmit the second response signal 1605 if the occurrence of a retransmission event is identified.

In a third time interval T3, the first device 202-1 may retransmit the first data 1601 to the second device 202-2 via the third link 215. For example, the first device 202-1 may receive, from the second device 202-2 via the third link 215, a response signal 1606 indicating whether the first data 1601 retransmitted by the first device (e.g., the first device 202-1) is received.

In a fourth time interval T4, the first device 202-1 may transmit a third response signal 1607 for instructing resumption of transmission of subsequent data to the user device 201 via the first link 205. For example, a packet header of the third response signal 1607 may include information instructing resumption of transmission of subsequent data. For example, the first device 202-1 may transmit the third response signal 1607 only when the response signal 1606 for the first data 1601 retransmitted in the third time interval T3 indicates acknowledgement. For example, the first device 202-1 may additionally retransmit the first data 1601 to the second device 202-2 if the acknowledgement of the first data 1601 retransmitted in the third time interval T3 is not received. In this case, if the acknowledgement is not received, the first device 202-1 may perform additional retransmission based on a specified number of times of retransmission or a specified retransmission time.

In a fifth time interval T5, the user device 201 may transmit the second data 1609 subsequent to the first data 1601 via the first link 205 in response to the third response signal 1607. For example, the second device 202-1 may transmit a response message 1608 for the second data 1609 to the first device 202-1 via the third link 215.

In a sixth time interval T6, the first device 202-1 may transmit, to the user device 201, a fourth response signal 1611 indicating whether the second data 1609 is received. In the sixth time interval T6, the first device 202-1 may transmit the fourth response signal 1611 including an acknowledgement (ACK) if the response message 1608 from the second device 202-2 indicates ACK and the first device 202-1 has successfully received the second data 1609. For example, a packet header of the fourth response signal 1611 may include information instructing resumption of transmission of subsequent data.

According to certain embodiments of the present disclosure, an electronic device may reduce unnecessary resource consumption in a Bluetooth network environment and may increase the throughput of the Bluetooth network.

Besides, various effects may be provided that are directly or indirectly identified through the present disclosure.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a wireless communication circuit configured to support Bluetooth communication;
   at least one processor operatively connected to the wireless communication circuit; and
   a memory operatively connected to the at least one processor,
   wherein the memory stores one or more instructions that, when executed, cause the at least one processor to perform a plurality of operations comprising:
   receiving first data transmitted from a first external electronic device via a first link between the electronic device and the first external electronic device; and
   when an acknowledgement (ACK) is not received from a second external electronic device, determining that the first external electronic device or the electronic device should retransmit the first data to the second external electronic device based on status information about the electronic device,
   wherein the status information about the electronic device comprises a battery level of the electronic device, and
   wherein the plurality of operations further comprise:
   when the battery level is at least a specified level, retransmitting the first data to the second external electronic device via the second link; and
   when the battery level is less than the specified level, transmitting a request signal to the first external electronic device to retransmit the first data via the first link.

2. The electronic device of claim 1,
   wherein the plurality of operations further comprise transmitting a request signal to the first external electronic device to retransmit the first data via the first link when determining that the first external electronic device should retransmit the first data,
   wherein the request signal indicates NACK for the first data.

3. The electronic device of claim 1,
   wherein the plurality of operations comprise transmitting a first response signal indicating ACK of the first data to the first external electronic device via the first link, and retransmitting the first data to the second external electronic device via the second link, when it is determined that the electronic device should retransmit the first data.

4. The electronic device of claim 3, wherein the first response signal comprises information that causes suspension of transmission of second data subsequent to the first data.

5. The electronic device of claim 4,
   wherein the plurality of operations further comprise:
   receiving ACK from the second external electronic device in response to retransmission of the first data via the second link; and
   transmitting a second response signal to the first external electronic device via the first link in response to reception of the ACK,
   wherein the second response signal comprises information that causes transmission of the second data.

6. A method for retransmitting data of an electronic device, the method comprising:
   creating a first link with a first external electronic device using a wireless communication circuit of the electronic device;
   creating a second link with a second external electronic device using the wireless communication circuit;
   receiving first data transmitted via the first link from the first external electronic device;
   monitoring the second link for a response to the first data from the second external electronic device; and
   when the response is not received or indicates a negative acknowledgement (NACK), determining that the first external electronic device or the electronic device should retransmit the first data to the second external electronic device based on status information about the electronic device,
   wherein the determining that the first external electronic device or the electronic device should retransmit the first data to the second external electronic device comprises:
   when a battery level of the electronic device indicated by the status information about the electronic device is at least a specified level, retransmitting the first data to the second external electronic device via the second link; and
   when the battery level is less than the specified level, transmitting a request to the first external electronic device to retransmit the first data via the first link.

7. The method of claim 6, further comprising transmitting a first response signal indicating ACK of the first data to the first external electronic device via the first link when it is determined that the electronic device should retransmit the first data; and retransmitting the first data to the second external electronic device via the second link.

8. The method of claim 7, wherein the first response signal comprises information that causes suspension of transmission of second data subsequent to the first data.

9. The method of claim 8, further comprising:

transmitting a second response signal to the first external electronic device via the first link when ACK is received from the second external electronic device in response to transmission of the first data via the second link, wherein the second response signal comprises information that causes transmission of the second data.

10. An electronic device comprising:

a wireless communication circuit configured to support Bluetooth communication;

at least one processor operatively connected to the wireless communication circuit; and a memory operatively connected to the at least one processor, wherein the memory stores one or more instructions that, when executed, cause the at least one processor to perform a plurality of operations, wherein the plurality of operations comprise:

creating a first link with a first external electronic device using the communication circuit;

creating a second link with a second external electronic device using the communication circuit;

transmitting first data to the first external electronic device via the first link;

receiving, from the first external electronic device via the first link, a first response indicating an acknowledgement (ACK) of the first data;

receiving, from the second external electronic device via the second link, a second response indicating negative ACK (NACK) for the first data; and determining that the first external electronic device or the electronic device should retransmit the first data to the second external electronic device based on at least one of status information about the electronic device, wherein the status information about the electronic device comprises a battery level of the electronic device, and wherein the plurality of operations further comprise:

when the battery level is at least a specified level, determining that the electronic device should retransmit the first data via the first link; and when the battery level is less than the specified level, determining that the first external electronic device should retransmit the first data via a third link between the first external electronic device and the second external electronic device.

11. The electronic device of claim 10, wherein the plurality of operations further comprise transmitting a request signal for instructing retransmission of the first data to the first external electronic device via the first link when it is determined that the first external electronic device should retransmit the first data.

* * * * *